United States Patent [19]

Kubacki

[11] 3,714,854

[45] Feb. 6, 1973

[54] MACHINE FOR PERFORMING AN OPERATION ON ARTICLES

[75] Inventor: Edward Frank Kubacki, Arlington Heights, Ill.

[73] Assignee: American Can Company, Greenwich, Conn.

[22] Filed: July 2, 1971

[21] Appl. No.: 159,401

[52] U.S. Cl. .............................................. 82/101 R
[51] Int. Cl. ............................................... B23b 3/04
[58] Field of Search ........................... 82/46, 48, 101

[56] References Cited

UNITED STATES PATENTS

| | | | |
|---|---|---|---|
| 2,298,366 | 10/1942 | Gladfelter et al | 82/101 |
| 2,729,879 | 1/1956 | Sampson | 82/46 |

*Primary Examiner*—Hamson L. Harrison
*Attorney*—Robert P. Auber et al.

[57] ABSTRACT

A high speed mechanical-electric-hydraulic system for synchronizing the indexing and dwell of a multi-pocketed article aligning turret and the operation of an operating station with the forward and reverse strokes of a hydraulically actuated reciprocable feed slide which transfers successive articles into and out of the operating station from and to the turret, wherein during separate angular portions of a single rotational cycle of a rotating drive means of the system, a primary electrical command signal is generated by the mechanical-electrical components of the system to control the metering of fluid in the hydraulic component to initiate each forward and reverse stroke of the slide, the motion of the slide thereby generating a secondary electrical signal which is impressed on the primary electrical signal to produce a modified electrical signal which controls the metering of hydraulic fluid to the slide to control the slide during the balance of each stroke, and during other separate angular portions of the single rotational cycle of the rotating drive means, the turret is indexed and the station is operated by the drive means.

29 Claims, 8 Drawing Figures

INVENTOR.
EDWARD FRANK KUBACKI
BY John R. Flanagan
ATTORNEY

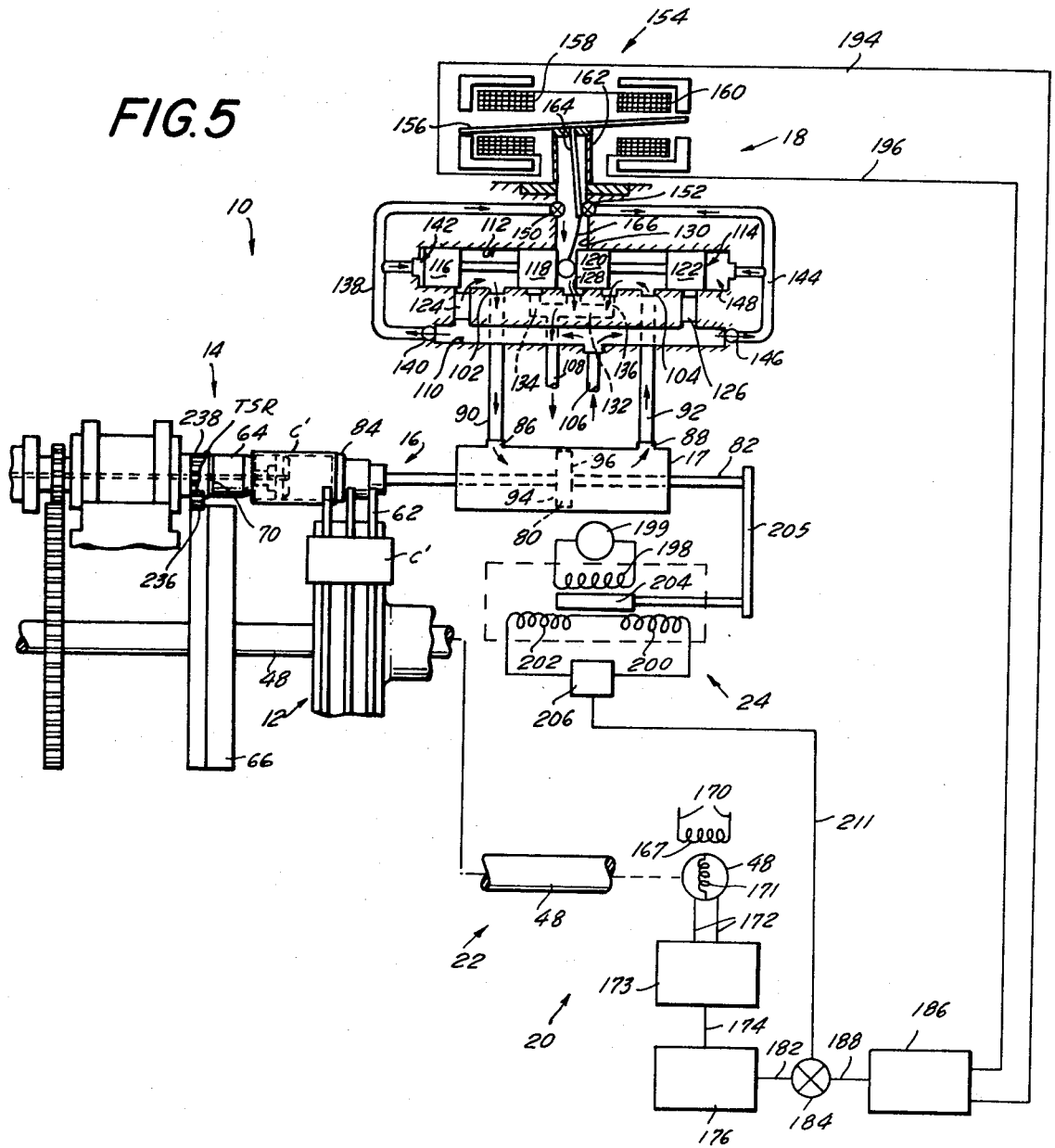

MACHINE FOR PERFORMING AN OPERATION ON ARTICLES

BACKGROUND OF THE INVENTION

The present invention relates broadly to a machine having a station for performing an operation on articles, and, more particularly, is concerned with a machine having a mechanical-electro-hydraulic system which allows the machine to operate at a substantially greater speed and, accordingly, to perform its operation on a significantly higher number of articles per each minute of machine operation.

The machine involved is of the kind having an article aligning means, such as a rotary multi-pocketed turret, which is indexed to sequentially and successively align articles with the operating station, reciprocable means, such as a feed slide, which dwells before its forward stroke when the article aligning means is indexed to align an article with the operating station, operates through a forward stroke to transfer the aligned article laterally out of the aligning means and into the operating station, dwells at the end of its forward stroke while the station operates on the article, and operates through a reverse stroke to transfer the article laterally out of the operating station and back onto the aligning means.

In a machine of this kind, normally the reciprocable means is timed in relation to the operations of the article aligning means and the station by way of mechanical linkage which inherently limits the speed of operation of the machine and, accordingly, the number of articles which can be operated on per minute of machine operation.

An alternative approach to the use of mechanical linkage systems is that provided by the present invention. The present invention utilizes a mechanical-electro-hydraulic system which simulates the results which would be obtained by a mechanical cam and linkage drive system, but eliminates the physical mass of mechanical equipment associated with the mechanical linkage approach, its associated speed limitations, and the need for adjusting the timing of the component machine operations with variations in the machine operating speed.

When the mechanical-electro-hydraulic system of the present invention is applied to the mechanical components of a can body trimming machine, for example, as disclosed in U.S. Pat. No. 3,425,251, the operation speed of the machine is increased from about 120 cpm (cans per minute) to about 200 cpm.

The primary advantages of the electro-hydraulic system are its increased precision, speed and the simplification of setup procedures.

The precision which this system achieves is derived from the ability of an electro-hydraulic servo valve component of the system, which meters the flow of hydraulic fluid to operate the reciprocable feed slide means, to accurately follow an electrical command signal which is generated by electrical components associated with a rotating shaft of the drive means of the machine and which is a function of the shaft angular position during each rotation cycle of the shaft. An electro-hydraulic servo valve component of this type is shown in greater detail in U.S. Pat. No. 3,023,782.

The high speed capability of this system is derived from the high acceleration forces available in a hydraulically powered system as well as the high frequency response of the electrical components within the servo valve component in regulating the flow of hydraulic fluid to the reciprocable feed slide means.

The simplified setup procedure of this system is a direct result of the electrical components used to generate the electrical command or primary signal. The ability to generate this command signal as a function of the shaft angular position during each rotation cycle of the shaft eliminates the need for logic circuitry to sequence the various movements and operations of the machine components. Further, this ability combined with the accuracy of the electro-hydraulic servo valve component eliminates the need for adjusting the timing relation between the reciprocable feed slide means and the operations of the article aligning turret and the operating station for each variation in the operating speed of the rotating drive means of the machine. Simply stated, the mechanical-electro-hydraulic system of the present invention, when applied to the can body trimming machine, as disclosed by the aforementioned patent, allows the trimming machine to be operated at any rate from 20 to 200 cpm without requiring any adjustments to the system.

In summary, the advantages of the present invention are, first, the achievement of higher operational speeds, second, the direct mechanical-electro-hydraulic connection of translatory slide means motion with drive means rotary motion via the mechanical-electro-hydraulic system which eliminates the need for a logic system to guarantee proper sequencing of the feed slide means with the other component operations of the machine, third, the application of the present invention to any single or multiple spindle machine where it is desirous to change rotary driving motion into translational motion of other machine components, and, fourth, the application of the present invention to machines wherein it is desirable to provide for changes in linear translational motion rates and dwell durations of the feed slide means, as well as adjustable stroke length, while still maintaining a direct integral timing relation with the drive means rotary motion.

The above described advantages of the present invention will become more apparent from the drawings and description of the preferred embodiment of the invention which follows hereinafter.

SUMMARY OF THE INVENTION

The present invention broadly comprises in a machine for performing an operation on articles, the combination of an operating station, means for successively aligning the articles with the operating station, reciprocable means operable through a forward and a reverse stroke for successively transferring the articles into and out of the station, electro-hydraulic means for hydraulically operating the reciprocable means, and primary electro-mechanical means including rotating drive means which provides the mechanical rotary motion within the primary electro-mechanical means for generating a primary electrical signal for each cycle of the drive means to hydraulically initiate each forward and each reverse stroke of the reciprocable means. Further, during each rotation cycle of the drive means, the drive means actuates the article aligning means before the forward stroke of the reciprocable means and actuates the operating station after the forward stroke and before the reverse stroke of the reciprocable means. The present invention further comprises the aforesaid combination together with secondary electromechanical means actuated by the reciprocable means after each stroke has been initiated for generating a secondary electrical signal which is impressed on the primary electrical signal to produce a modified electrical signal which further actuates the electro-hydraulic means to hydraulically control the reciprocable means during the balance of each stroke of the reciprocable means.

BRIEF DESCRIPTION OF THE DRAWINGS

FIG. 5 is a schematical representation of the machine of FIG. 1 showing the trimmed can body moving toward the article aligning means during the reverse stroke of the reciprocable means;

GENERAL DESCRIPTION OF A CAN BODY TRIMMING MACHINE WHICH CONSTITUTES THE PREFERRED EMBODIMENT OF THE INVENTION

Figure 1:
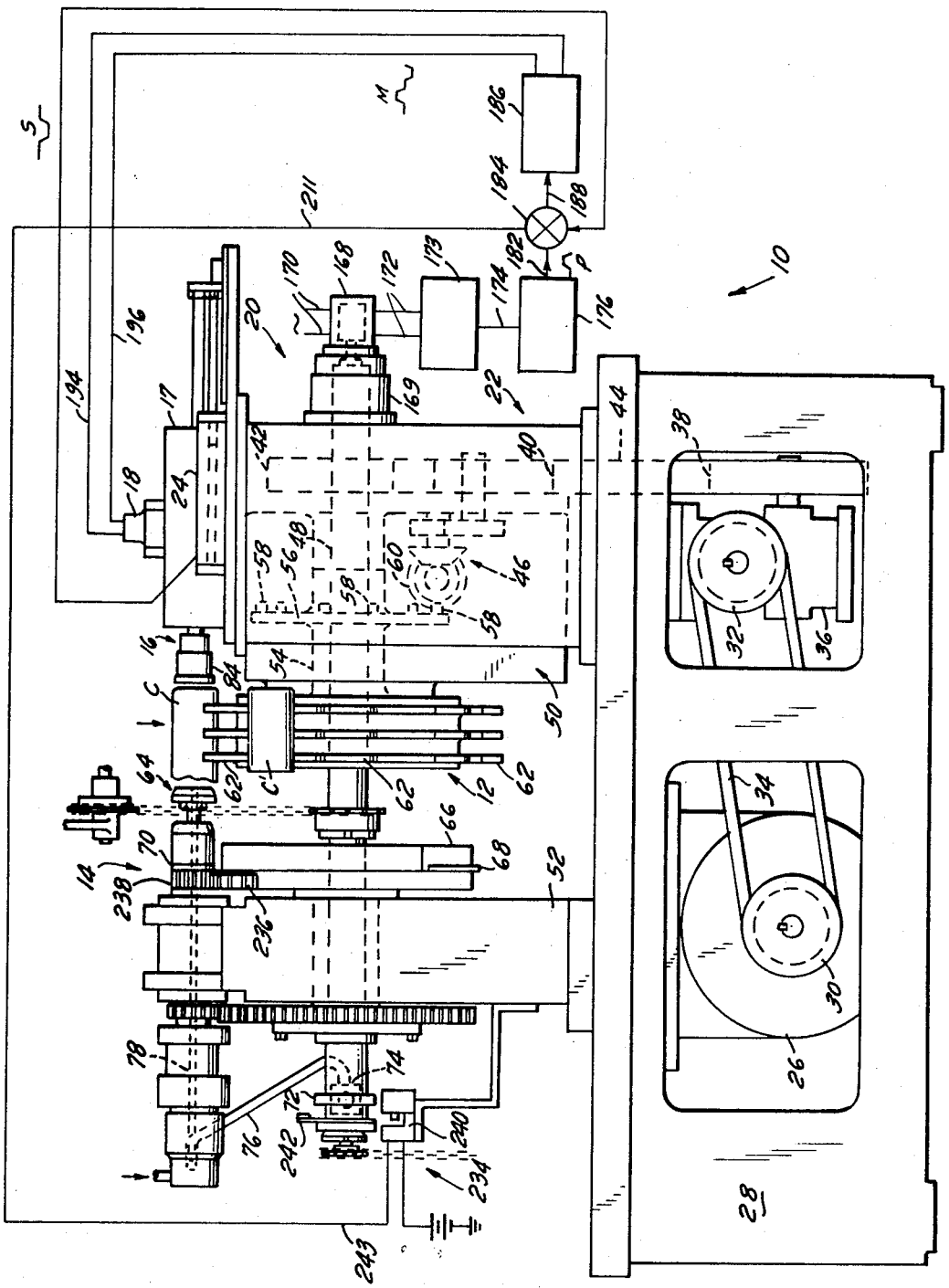
FIG. 1 is an elevational view of a can body trimming machine embodying the novel mechanical-electrohydraulic system comprising the present invention.

In FIG. 1, a can body trimming machine, generally designated 10, is shown embodying the novel mechanical-electro-hydraulic system which broadly comprises the present invention, the can body trimming machine 10 being only the preferred and exemplary embodiment of the present invention. Some of the mechanical components of the can body trimming machine 10 of FIG. 1 are substantially the same as those disclosed in U.S. Pat. No. 3,425,251, the disclosure of which is incorporated herein by reference thereto. Therefore, only those mechanical components of the machine 10 which are not adequately disclosed in said patent, or which are different from those disclosed in said patent, will be described in detail hereinafter.

During each cycle of the can body trimming machine 10, a rotatable multi-pocketed indexing turret 12 aligns an untrimmed can body C with a trimming station, generally designated 14, which is positioned on one side of the indexing turret 12, and with a hydraulically-operated piston rod means 16 reciprocably mounted within a hydraulic cylinder 17, which is positioned on the other side of the indexing turret 12, along a common axis. The reciprocable piston rod means 16 is operable through a forward and reverse stroke during each cycle of the can body trimming machine 10 for respectively transferring the untrimmed can body C into the trimming station 14 and transferring the trimmed can body C' (FIG. 5) out of the trimming station 14. Further, the reciprocable piston rod means 16 is dwellable before each stroke during each cycle of the can body trimming machine 10.

An electro-hydraulic servo valve means generally designated by the numeral 18 hydraulically operates the reciprocable piston rod means 16 through each of its strokes and dwells during each cycle of the trimming machine 10.

A primary electro-mechanical means, generally designated 20, includes a rotating drive means, generally designated 22, which provides the mechanical rotary motion within the primary electro-mechanical means 20 for generating a primary electrical signal P for each cycle of said drive means 22 to electrically actuate the electro-hydraulic servo valve means 18 to thereby hydraulically initiate each forward and each reverse stroke of the reciprocable piston rod means 16. Further, during each rotation cycle of the drive means 22, the drive means 22 actuates the indexing turret 12 before the forward stroke of the reciprocable piston rod means 16 and actuates the trimming station 14 to perform the trimming of untrimmed can body C after the forward stroke and before the reverse stroke of the reciprocable piston rod means 16.

A secondary electro-mechanical transducer means generally designated by the numeral 24, which is actuated by the reciprocable piston rod means 16 after each stroke has been initiated, generates a secondary electrical signal S which is impressed on the earlier-generated primary electrical signal P to produce a modified electrical signal M which further actuates the electro-hydraulic servo valve means 18 to hydraulically control the reciprocable piston rod means 16 during the balance of each stroke of the reciprocable piston rod means 16. Further, the secondary electro-mechanical transducer means 24, before each stroke of the reciprocable piston rod means 16 has been initiated, generates additional portions of the secondary electrical signal S which are impressed on portions of the earlier-generated primary electrical signal P to produce portions of the modified electrical signal M which further actuate the electro-hydraulic servo valve means 18 to hydraulically dwell the reciprocable piston rod means 16 before each of its strokes are initiated.

DRIVE MEANS

The source of motive power for the drive means 22 of the machine 10 is a motor 26 which is supported by a frame base 28 of the machine 10. The shaft of motor 26 is coupled by way of pulleys 30, 32 and a belt 34, which is coupled between the pulleys 30, 32, to drive the input shaft of a reduction gear unit 36 which is also supported by frame base 28. The output shaft of the reduction gear unit 36, which is a component of the drive means 22, is coupled by way of pulleys 38, 40, 42 and a belt 44, which couples pulleys 38, 40, 42 to each other, to drive the input shaft of a cam and gear unit, generally designated 46, and a main shaft 48, which form the remaining components of the drive means 22. The cam and gear unit 46 is mounted on frame support 50. The main shaft 48 is rotatably mounted on frame support 50 and on another frame support 52. Since the diameters of pulleys 38, 40, 42 are equal, the main shaft 48, the output shaft of the reduction gear unit 36 and the input shaft of the cam and gear unit 46 will rotate at the same speed, or, in other words, in a one-to-one rotation ratio. Therefore, the components of the drive means 22 will have a uniform rotation cycle.

INDEXING TURRET

The rotatable multi-pocketed indexing turret 12 includes a hub 54 which is rotatably mounted on frame support 50. Radiating from an integral disc flange 56 formed on hub 54 are a number of evenly spaced drive pins 58 that are sequentially operated upon by a barrel cam 60 of the cam and gear unit 46. For example, there may be twelve of the drive pins 58 so that for each rotation cycle of the input shaft of the cam and gear unit 46, the indexing turret 12 will rotate approximately 30° or one-twelfth of a full rotation cycle. The barrel cam 60 of the cam and gear unit 46 is preferably designed such that 90° or one-fourth of a single rotation of the barrel cam 60 (and of the input shaft of unit 46) operates the indexing turret 12 through approximately the one-twelfth of a single rotation of the turret 12. During the other 270°, or three-fourths of a single rotation of the barrel cam 60 (and the input shaft of unit 46), the indexing turret 12 dwells or remains at rest.

The indexing turret 12 has a series of equally spaced pockets 62 around its periphery. The indexing turret 12 will have 12 such pockets 62 in the case where twelve drive pins 58 are utilized to index the turret 12 through one step, comprising one-twelfth of its rotation cycle for each rotation cycle of the drive means 22. Untrimmed can bodies C are successively infed to the pockets 62 on the turret 12 and trimmed can bodies C' are successively discharged from the pockets 62 by any suitable feeding and guiding means, for instance, as disclosed in the aforementioned U.S. Pat. No. 3,425,251. Rotation of the indexing turret 12 causes each of the pockets 62 which contains an untrimmed can body C to assume a position which is intermediate to those of the pockets 62 respectively located at the infeed and discharge positions of the turret 12, where at this intermediate position the can body C is concentrically aligned with the trimming station 14 and the reciprocable piston rod means 16, along a common axis.

TRIMMING STATION

A can receiving mandrel 64 of the trimming station 14 is coupled to the rotating main shaft 48 which thereby continuously rotates the mandrel 64. Further, a tool carrier wheel 66 of the trimming station 14 is fixedly mounted on rotating main shaft 48 and continuously rotated by the shaft 48. The mechanical parts which couple the mandrel 64 to the rotating main shaft 48 are disclosed in greater detail in the aforementioned U. S. Pat. No. 3,425,251.

A knife sector 68 is fixedly mounted on the tool carrier wheel component 66 of the trimming station 14 and, thus, as the wheel 66 rotates, the knife sector 68 revolves through a circular path of travel. During the movement of the knife sector 68 through a portion of its circular path, it is in a position tangential to a circumferential cutter member 70 which is incorporated on the rotating can receiving mandrel 64, wherein within this path portion the knife sector 68 and the cutter member 70 assume a mating relation which effectuates trimming of a rotating can body C. The design of the knife sector 68 and the cutter member 70 are disclosed in greater detail in the aforementioned U. S. Pat. No. 3,425,251.

Since the tool carrier wheel 66 turns through one rotation cycle for each rotation cycle of the rotating main shaft 48 of the drive means 22, the knife sector 68 moves through this portion of its circular path of revolution during each rotation cycle of the drive means 22. Accordingly, the timing of the trimming operation being effectuated at the station 14 by the mating of the knife sector 68 and the cutter member 70 may be preset with respect to the actuation of the indexing turret 12 by the drive means 22, which actuation has been described above, and further may be preset with respect to the stroke movements and dwells of the reciprocable piston rod means 16 which are integrally tied-in with each rotation cycle of the drive means, as will be clearly described below, by circumferentially displacing the knife sector 68 about the wheel 66 with respect to the initial angular position of the wheel 66 and shaft 48 at the start of the rotation cycle of the shaft 48.

Also at the trimming station 14, an edge cam 72 is fixedly mounted on the main shaft 48 of the drive means 22 which during a predetermined portion of each rotation cycle of the shaft 48 engages a plunger-actuated valve 74 which allows the introduction of compressed air via pipe 76 into a central bore 78 defined within the can receiving mandrel 64. The engagement of the plunger-actuated valve 75 by the rotating edge cam 72 is timed to coincide with the completion of the trimming operation at station 14 and with the duration of the reverse stroke movement of the reciprocable piston rod means 16 so that the compressed air discharging through the can receiving mandrel 64 will cause the trimmed can body C' to follow the retracting piston rod means 16 until the can body C' is replaced back in the pocket 62 of the turret 12 at the termination of the reverse stroke movement of the reciprocable piston rod means 16.

RECIPROCABLE FEED SLIDE MEANS

Figure 2:
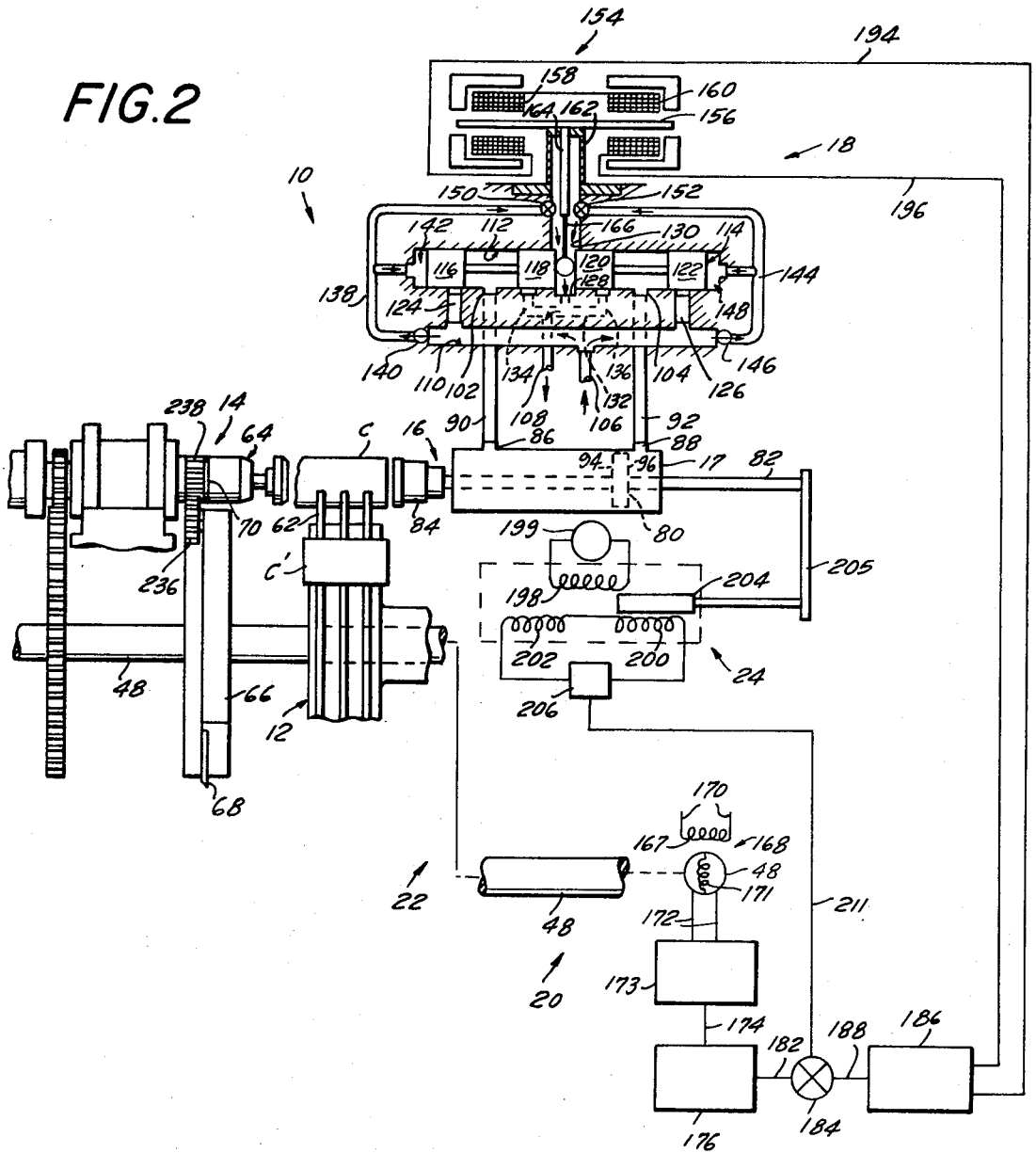
FIG. 2 is a schematical representation of the machine of FIG. 1 showing an untrimmed can body positioned on the article aligning means aligned with the operating station and the reciprocable means before commencement of the forward stroke of the reciprocable means.

The hydraulically-operated piston rod means 16 reciprocably mounted within the hydraulic cylinder 17 which is mounted on the frame support 50, is positioned to one side of, and in axial alignment with, the can receiving mandrel 64 of the trimming station 14. The piston rod means 16 has a piston element 80 slideably mounted within the cylinder 17 and fixedly mounted on a rod element 82 (FIG. 2) which has an article loading element 84 fixed to its end which is near to the indexing turret 12. The article loading element 84 is disclosed in greater detail in the aforementioned U. S. Pat. No. 3,425,251. The hydraulic cylinder 17 has a front port 86 and a rear port 88, as schematically shown in FIG. 2, through which hydraulic fluid will flow from, or to, respective supply pipes 90, 92 which communicate the cylinder 17 with the electro-hydraulic servo valve means 18. The front port 86 allows hydraulic fluid to communicate with the front surface 94 of the piston element 80 and the rear port 88 allows the fluid to communicate with the rear surface 96 of the piston element 80. The actuation of the piston rod means 16 through its longitudinal stroke movements and periods of dwell will be clearly described below in connection with the description of the primary and secondary electro-mechanical means 20, 24.

ELECTRO-HYDRAULIC SERVO VALVE MEANS

The electro-hydraulic servo valve means 18, which is shown in FIG. 1 mounted on the top of hydraulic cylinder 17 is disclosed in great detail in U. S. Pat. No. 3,023,782, the disclosure of which is incorporated herein by reference thereto. A suitable electro-hydraulic servo valve is made by Moog Servocontrols, Inc. of East Aurora, New York, Model Nos. 76–104 or 76–399.

The servo valve means 18 controls the flow of hydraulic fluid to and from the cylinder 17 through the respective pipes 90, 92 which respectively communicate the front and rear ports 86, 88 of the cylinder 17 with front and rear actuating ports 102, 104 of the servo valve means 18 (FIG. 2). The servo valve means 18 also has a supply pipe 106 through which flows a suitable hydraulic fluid under pressure from a suitable source (not shown) into the servo valve means 18, and a return pipe 108 from which flows the fluid from the servo valve means 18. The arrows depict the path of flow of the hydraulic fluid within the servo valve means 18 (FIGS. 2 through 5).

In the servo valve means 18, as shown in schematic form in FIGS. 2 through 5 the supply pipe 106 is in constant communication with a supply chamber 110 which is provided within the servo valve means 18 to one side of the supply pipes 90, 92 and also to one side of the return pipe 108. The servo valve means 18 further has a second chamber 112 provided therein within which a valve spool 114 is slideably arranged. The valve spool 114 has cylindrical lobes 116, 118, 120, 122. The front actuating port 102 constantly communicates with that portion of the chamber 112 between the lobes 116, 118 of the valve spool 114. The rear actuating port 104 constantly communicates with that portion of the chamber 112 between the lobes 120, 122. A branch passage 124 extends between the chambers 110, 112. The end lobe 116 on the valve spool 114 controls the communication between this branch passage 124 and the chamber 112. In a similar manner, another branch passage 126 extends between the chambers 110, 112. The other end lobe 122 on the valve spool 114 controls the communication between this branch passage 126 and the chamber 112.

Further in the servo valve means 18, the return pipe 108 is in constant communication with a third chamber 128 provided within the servo valve means 18 which is shown in FIGS. 2 through 5 as having its upper end opening into and connecting with the spool chamber 112. Arranged above the center portion of the valve spool 114 within the servo valve means 18 is a fourth chamber 130 which has its lower end opening into and connecting with the spool chamber 112. The axial extent of the ends of the chambers 128, 130 adjacent the spool chamber 112 is greater than the axial distance between the lobes 118, 120 of the valve spool 114. The portion of the spool chamber 112 between the lobes 118, 120 serves as a constant connection between the chambers 128, 130 in all axial positions of the valve spool 114. The lower end of chamber 128 is connected to a passage 132, which passage 132 at one end has an upward branch 134 which opens into the spool chamber 112 adjacent the outer end of the left center lobe 118 of the valve spool 114. At its other end, the passage 132 has an upward branch 136 which opens into the spool chamber 112 adjacent the outer end of the right center lobe 120 of the valve spool 114. Further, the passage 132 provides the constant communication between chambers 128, 130 and the return pipe 108.

As set forth in greater detail in the aforementioned U. S. Pat. No. 3,023,782, the branch passages 124, 126 and the upward branches 134, 136 serve as fluid metering ports when their respective spool lobes uncover them. With the valve spool 114 in a null or centered position (FIGS. 2 and 4), the lobe 116 covers and completely closes the metering port 124, as does the lobe 118 with respect to the metering port 134, the lobe 120 with respect to the metering port 136, and the lobe 122 with respect to the metering port 126.

A passage 138 in the left side of the servo valve means 18 having a fixed orifice 140 at its one end establishes communication between the chamber 110 and the portion of the spool chamber 112 laterally outwardly of the left end lobe 116 of the valve spool 114. Such end portion of the chamber 112 is generally designated 142. Similarly, at the right side of the servo valve means 18, a passage 144 having a fixed orifice 146 at its one end establishes communication between the chamber 110 and that end portion of the chamber 112 laterally outwardly of the right end lobe 122 of the valve spool 114, such end portion of the spool chamber 112 being generally designated 148.

The passage 138 in the left side of the servo valve means 18 further has a variable orifice 150 at its other end which establishes communication between the chamber 110, the end portion 142 of the chamber 112, and the chamber 130 which is arranged above the center portion of the valve spool 114. Similarly, at the right side of the servo valve means 18, the passage 144 further has a variable orifice 152 at its other end which establishes communication between the chamber 110, the end portion 148 of the chamber 112, and chamber 130.

A polarized electrical torque force motor, generally designated 154, is arranged in the top of the servo valve means 18. An armature member 156 is operatively associated with the motor 154 being surrounded by torque motor coils 158, 160 with its outer extremities within the air gaps between the spaced pole pieces of the motor 154. The armature member 156 is mounted on a flexure tube member 162 and has a rigid flapper member 164 connected to it which, surrounded by the tube 162, extends downwardly from the armature member 156 through the tube 162 to a position adjacent and equally spaced from the variable orifices 150, 152. Actually the provision of the flapper member 164 serves to make orifices 150, 152 variable. The orifices 150, 152 are varied by positioning the lower end of the flapper member 164 closer toward one of them while moving said end a corresponding distance farther away from the other of the orifices 150, 152. A feedback spring wire 166 has one end attached to the lower end of the flapper member 164 and its other end anchored between the lobes 118, 120 of the valve spool 114 by a frictionless engaging ball on that end of the feedback spring wire 166. Thereby, the feedback spring wire 166 and integrally connected flapper member 164 mechanically link the armature member 156 with the valve spool 114. A more detailed description of the design and construction of the motor 154, the armature member 156, the flapper member 164 and the feedback spring wire 166 is disclosed in greater detail in the aforementioned U. S. Pat. No. 3,023,782. These parts are merely schematically illustrated here as shown in FIGS. 2 through 5 and 7 of the drawings. For instance, as explained above, the armature member 156 and the flapper member 164 are herein shown as a rigid T-shaped member supported on the flexure tube 162 and to the lower end of which the upper end of the depending feedback spring wire 166 is shown as secured.

Figure 3:
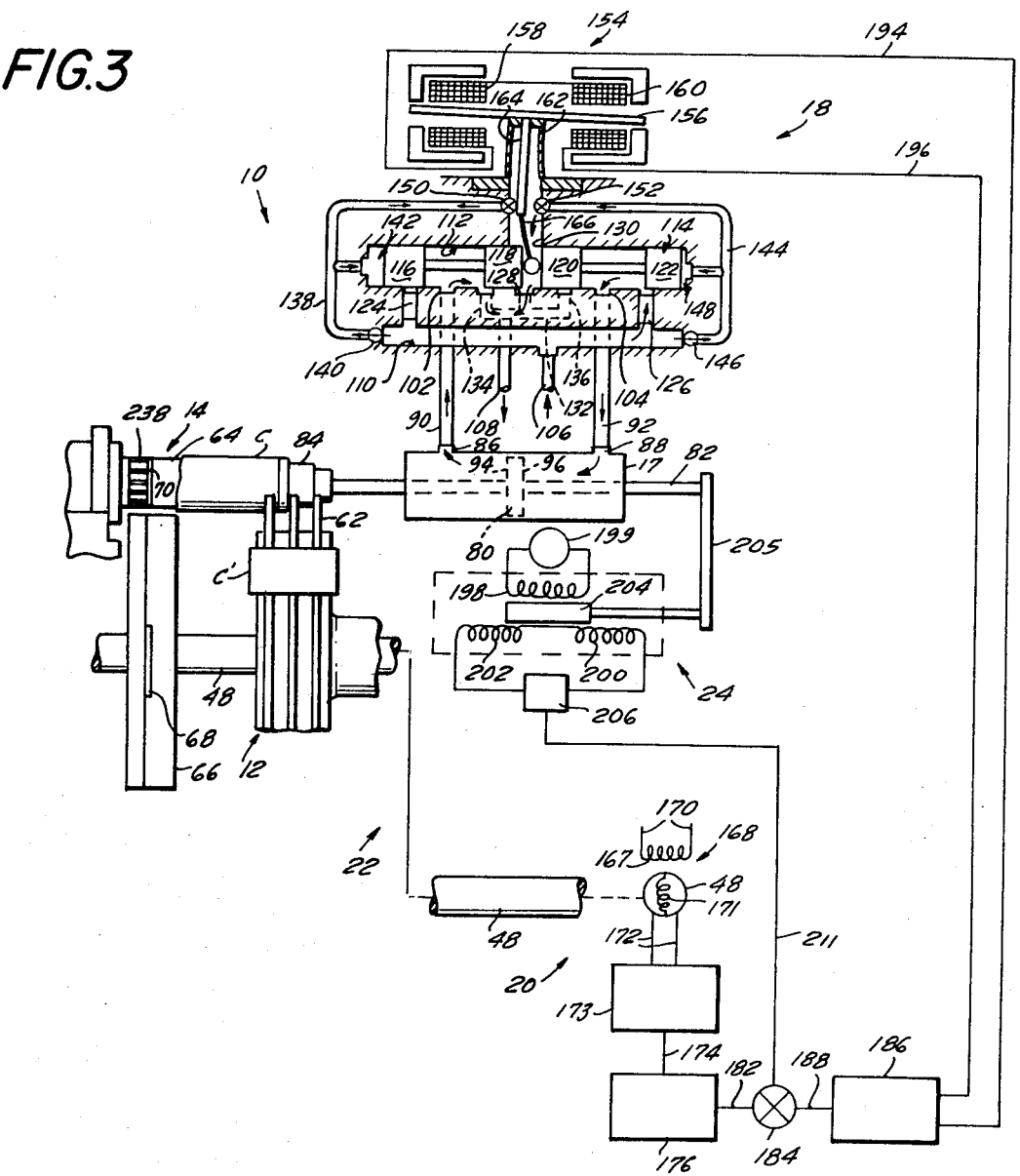
FIG. 3 is a schematical representation of the machine of FIG. 1 showing the untrimmed can body moving toward the operating station during the forward stroke of the reciprocable means.

Assume an electrical signal is applied to the coils 158, 160 of the motor 154 so as to apply a torque on the armature member 156 and its rigidly associated flapper member 164 in a clockwise direction as shown in FIG. 3. The armature and flapper members 156, 164 are caused to pivot about the flexure tube support 162. The resulting motion of the flapper member 164 causes the left variable orifice 150 to reduce in size or even close and the right variable orifice 152 to increase in size or open more. This has the effect of blocking the discharge of the fluid from passage 138 into the chamber 130 through the variable orifice 150 and of relieving obstruction to the discharge of fluid from passage 144 into the chamber 130 through the variable orifice 152. As a consequence, a pressure differential is produced in the passages 138, 144 with the higher pressure being in the passage 138. This pressure differential is applied to the left end of the lobe 116 of the valve spool 114 in the end portion 142 of the chamber 112. The net force hydraulically applied to the valve spool 114 will cause the valve spool 114 to displace to the right of the null or centered position, or, from the position shown in FIG. 2 to the position shown in FIG. 3. As the valve spool 114 moves from the centered position toward the right of center, a torque proportional to the valve spool displacement is applied to the armature-flapper member 156, 164 by the feedback spring wire 166. This feedback spring wire torque opposes the torque developed by the motor 154 and a condition of torque equilibrium will exist when the feedback spring wire torque equals the electrical motor torque.

In other words, the valve spool displacement to the right will continue until the feedback spring wire 166 has been bent sufficiently to apply a torque to the armature-flapper members 156, 164 which counterbalances the torque induced in the motor 154 by the electrical signal, leaving the flapper member 164 in a slightly off-centered position. While the upper end of the cantilever-mounted feedback spring wire 166 has been pivoted in a clockwise direction, along with the armature-flapper member 156, 164, the hydraulically induced left to right motion of the valve spool 114 will cause the lower end of the feedback spring wire 166 to be flexed to the right of the centerline of this normally straight wire 166 (FIG. 3). The slightly off-centered position in which the flapper 164 has been left in the torque equilibrium position, produces the pressure differential across the valve spool 114 the net effect of which is offset by the mechanical force exerted by the feedback spring wire 166 against the valve spool 114 and any flow reaction forces.

Therefore, the motion of the valve spool 114, which controls the flow of hydraulic fluid, is established through the use of a four arm balanced bridge hydraulic amplifier. The four arms of the bridge may be represented by pressures $A_1$ and $A_4$ respectively at the opposing fixed orifices 140, 146 and by pressures $A_2$ and $A_3$ respectively at opposing variable orifices 150, 152. When no electrical signal (current) is imposed on the torque motor coils 158, 160, a balanced bridge condition exists wherein $A_1$ equals $A_4$ and $A_2$ equals $A_3$. When an electrical signal (current) is applied in one direction through the torque motor coils 158, 160, the magnetic field of the motor 154 moves the armature member 158 and the flapper member 164 in either a clockwise or counterclockwise direction depending upon the direction of electrical signal flow. The result of this movement causes an unbalance condition to be produced in the hydraulic bridge by moving the flapper member 164 which varies the sizes of the variable orifices 150, 152. This unbalance condition, which is represented by either $A_2$ being greater than $A_3$, or $A_3$ being greater than $A_2$, is transmitted to the valve spool ends causing motion of the valve spool 114 in a direction which will result in rebalance of the hydraulic bridge amplifier through the feedback spring wire 166 which is frictionlessly connected to the valve spool 114.

Concurrently as the valve spool 114 moves from the centered position to its displaced torque equilibrium position to the right of center, the flow of hydraulic fluid through the servo valve means 18 is modified from that shown by FIG. 2 to that shown by FIG. 3. As the valve spool 114 so moves, the metering ports 126, 134 are increasingly opened or uncovered while metering ports 124, 136 remain closed. Thus pressurized fluid is metered by the port 126 from the supply pipe 106 into the rear actuating port 104 which is then conducted by way of the pipe 92 through the rear port 88 of the cylinder 17 to the rear surface 96 of the piston element 80, while the front surface 94 of the piston element 80, as the piston element 80 moves forward, conducts fluid to the return pipe 108 by way of the establishment of communication from the front port 86 of the cylinder 17 to the front actuating port 102 by way of pipe 90 and then from the front actuating port 102 to the return pipe 108 by way of the metering port 134. Accordingly, the metering flow of hydraulic fluid to, and from, the cylinder 17 through front and rear actuating ports 102, 104 is proportional to the displacement of the valve spool 114 from a centered or null position for a constant valve pressure drop.

Now assume an electrical signal is applied to the coils 158, 160 of the motor 154 so as to apply a torque on the armature member 156 and its rigidly associated flapper member 164 in a counterclockwise direction as shown in FIG. 5. The armature and flapper members 156, 164 are caused to pivot about the flexure tube support 162. The resulting motion of the flapper member 164 causes the right variable orifice 152 to reduce in size or even close and the left variable orifice 150 to increase in size or open more. This has the effect of blocking the discharge of the fluid from the passage 144 into the chamber 130 through the right variable orifice 152 and of relieving obstruction to the discharge of fluid from the passage 138 into the chamber 130 through the left variable orifice 150. As a consequence, a pressure differential is produced in the passages 138, 144 with the higher pressure being in passage 144. This pressure differential is applied to the right end of the lobe 122 of the valve spool 114 in the end portion 148 of the chamber 112. The net force hydraulically applied to the valve spool 114 will cause the valve spool 114 to displace to the left of the null or centered position, or, from the position shown in FIG. 4 to the position shown in FIG. 5. As the valve spool 114 moves from the centered position toward the left of center, a torque proportional to the valve spool displacement is applied to the armature-flapper members 156, 164 by the feedback spring wire 166. This feedback spring wire torque opposes the torque developed by the motor 154 and the condition of torque equilibrium will exist when the feedback spring wire torque equals the electrical motor torque.

Figure 4:
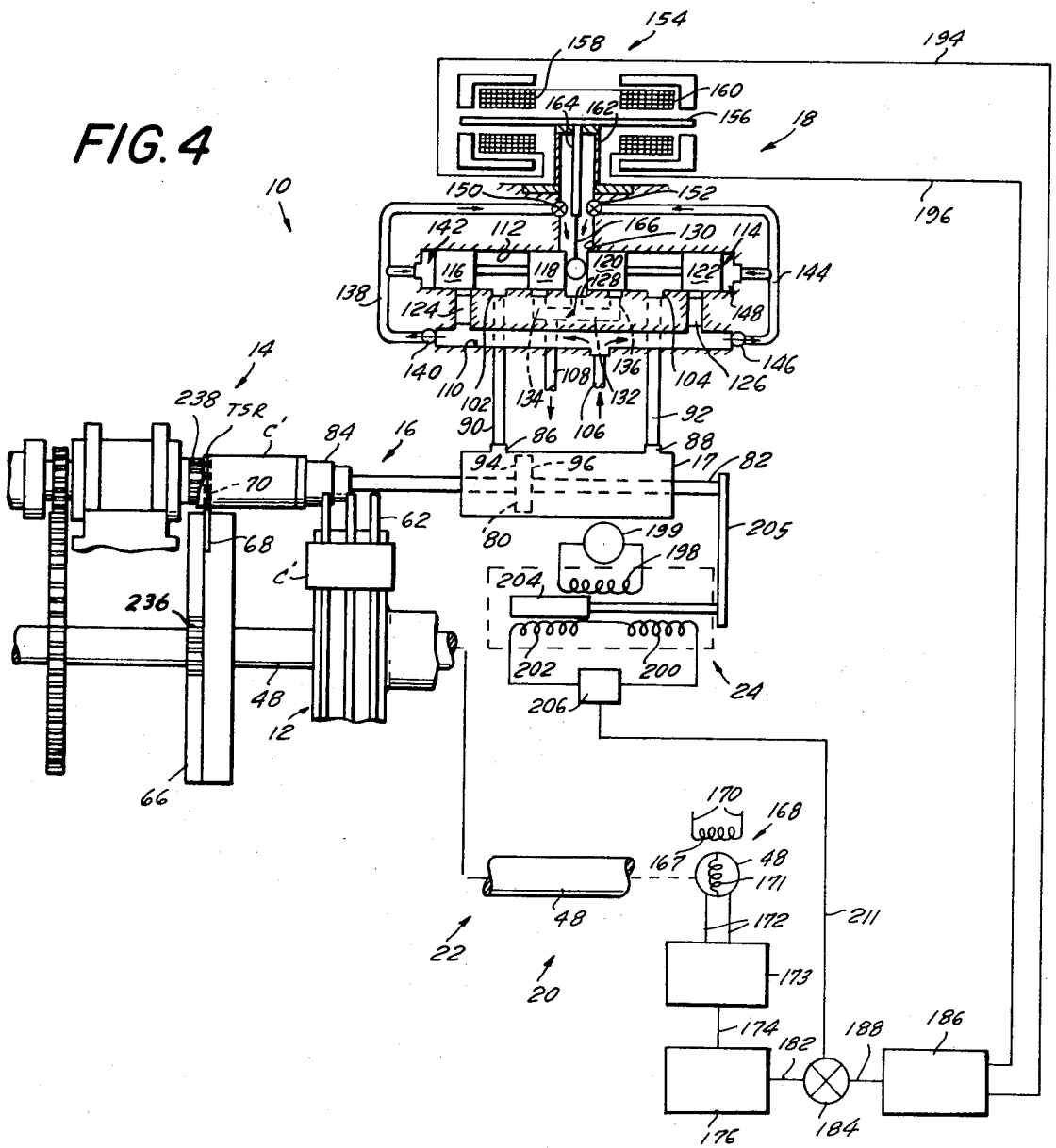
FIG. 4 is a schematical representation of the machine of FIG. 1 showing the partially trimmed can body during the trimming operation performed at the station.

Similarly, as in the case where the valve spool 114 moved from its centered position to its displaced torque equilibrium position to the right of center, when the valve spool 114 moves from its centered position to its torque equilibrium position to the left of center, the flow of hydraulic fluid through the servo valve means 18 is modified now from that shown by FIG. 4 to that shown by FIG. 5. As the valve spool 114 so moves, the metering ports 124, 136 are increasingly opened or uncovered while metering ports 126, 134 remain closed. Thus pressurized fluid is metered by the port 124 from the supply pipe 106 into the front actuating port 102 which is then conducted by way of the pipe 90 through the front port 86 of the cylinder 17 to the front surface 94 of the piston element 80, while the rear surface 96 of the piston element 80, as the piston element 80 moves rearward, conducts fluid to the return pipe 108 by way of the establishment of communication from the rear port 88 of the cylinder 17 to the rear actuating port 104 by way of pipe 92 and then from the rear actuating port 104 to the return pipe 108 by way of the metering port 136.

PRIMARY ELECTRO-MECHANICAL MEANS

One end of the main shaft 48 comprises the mechanical component of the drive means 22 which provides the mechanical rotary motion within the primary electro-mechanical means 20 for generating the primary electrical signal P for each rotation cycle of the drive means 22, and thus for each operational cycle of the machine 10.

A description of the wave forms of the respective electrical signals developed by sequentially arranged electrical components of the primary electro-mechanical means 20 which produce the primary electrical signal P during each rotation cycle of the drive means 22 to cause the stroke movements and dwell durations of the reciprocable piston rod means 16 and their relationship to the operation of the trimming station 14 and the actuation of the indexing turret 12 which are caused by each rotation cycle of the drive means 22 will be set forth hereinafter with reference to FIGS. 2 through 6 of the drawings.

A stationary coil 167 of a conventional synchro-resolver means 168 which is mounted on the bearing housing 169 of the main shaft 48 of the drive means 22 has impressed thereon from any suitable source through leads 170 an alternating voltage, for example having a value of 1.4 khz, and is magnetically coupled to a rotor coil 171 of the cynchro-resolver 168. The rotor coil 171 is mounted on the end of the rotating main shaft 48 of the drive means 22 and is rotatable therewith. A suitable synchro-resolver is made by General Precision Systems, Inc., Kearfott Group, of Oakbrook, Illinois, Model No. RS–931–3E.

The mechanical rotary motion of said shaft end, and thus of the rotor coil 171 generates a primary voltage signal $V_{sr}$ (FIG. 6) during each rotation cycle of said drive means 22, the voltage signal $V_{sr}$ being induced by the magnetic coupling of the stationary coil 167 to the rotor coil 171 and having a sine wave envelope component because of the rotation of the rotor coil. Lead wires 172 which are coupled to the rotor coil 171 through slip rings (not shown) connect the synchro-resolver means 168 to a demodulator means 173.

The demodulator means 173, which is preset to respond to the sine wave envelope component of the primary voltage signal $V_{sr}$, produces a demodulated primary voltage signal $V_{dsr}$ (FIG. 6) having a sine wave form equivalent to the sine wave envelope component of the primary voltage signal $V_{sr}$. A lead wire 174 connects the demodulator means 173 to a clipper means 176 which responds to the demodulated primary voltage signal $V_{dsr}$ and produces a clipped and demodulated primary voltage signal $V_{cdsr}$ (FIG. 6) having a reversing trapezoidal wave form with positive and negative slope components 178, 180. The combination of demodulator means 173 and the clipper means 176 may be termed a signal conditioning means.

A lead wire 182 connects the clipper means 176 to a summation means 184 which transfers the positive and negative slope components 178, 180 of the clipped and demodulated primary voltage signal $V_{cdsr}$ to an amplifier means 186 which is connected by a lead wire 188 to the summation means 184.

The remaining components of the clipped and demodulated primary voltage signal $V_{cdsr}$ are modified within the summation means 184 by a subsequently generated voltage signal $V_t$ (secondary electrical signal S) produced by the secondary electro-mechanical means 24 which will be described in greater detail below. Briefly for purposes of explanation here, the summation means 184 also responds to the secondary voltage signal $V_t$ and impresses the secondary voltage signal $V_t$ on the clipped and demodulated primary voltage signal $V_{cdsr}$ to produce a modified voltage signal $V_m$ (see FIG. 6), wherein the positive and negative slope components 178, 180 of said clipped and demodulated primary voltage signal $V_{cdsr}$ produce leading increasing positive and negative magnitude components of said modified voltage signal $V_m$. When the modified voltage signal $V_m$ is transferred to the amplifier means 186 from the summation means 184, the originally positive and negative slope components 178, 180 are converted by the amplifier means 186 into increasing positive and negative amplified magnitude components 190, 192 of a modified current signal $I_m$ (see FIG. 6), which modified current signal produced by the amplifier means 186 will be explained in greater detail below.

Lead wires 194, 196 connect the amplifier means 186 to the torque motor coils 158, 160 of the motor 154 of the electro-hydraulic servo valve means 18. The increasing positive amplified magnitude component 190 of the modified current signal $I_m$ moves from the amplifier means 186 by way of lead wire 194 to the coil 158 and returns from coil 160 by way of lead wire 196 to the amplifier means 186, to move the servo valve spool 114 from its centered or null position as shown in FIG. 2 to its displace position to the right as shown in FIG. 3, to thereby meter fluid to the rear surface 96, and from the front surface 94, of the piston element 80 to hydraulically initiate the forward stroke movement of the piston rod means 16. In a similar manner, subsequently the increasing negative amplified magnitude component 192 of the modified current signal $I_m$ moves from the amplifier means 186 by way of lead wire 196 to the coil 160 and returns from the coil 158 by way of lead wire 194 to the amplifier means 186, to move the servo valve spool 114 from its centered or null position as shown in FIG. 4 to its displaced position to the left as shown in FIG. 5, to thereby meter fluid to the front surface 94, and from the rear surface 96, of the piston element 80 to hydraulically initiate the reverse stroke movement of the piston rod means 16.

SECONDARY ELECTRO-MECHANICAL MEANS

The position transducer means 24 is mounted on the frame support 50 of the machine 10 and positioned approximately parallel to the hydraulic cylinder 17. The transducer means 24 has a primary coil 198 on which is impressed a predetermined alternating voltage signal from a suitable source 199. The transducer means 24 further has a pair of secondary coils 200, 202, series connected in opposition to one another.

A core element 204 is secured at its one end by a link member 205 to the end of the rod element 82 of the piston rod means 16 which is remote from the indexing turret 12, and correspondingly moves longitudinally within the transducer means 24 relative to the coils 198, 200, 202 as the piston rod means 16 is moved relative to the hydraulic cylinder 17. Depending upon its position relative to the secondary coils 200, 202 and the primary coil 198, the core element 204 will more, less or equally magnetically couple one of the secondary coils 200, 202 with the primary coil 198 when compared with the magnetic coupling of the primary coil 198 with the other of the secondary coils 200, 202. Opposing alternating voltages are induces in the secondary coils 200, 202 by the alternating voltage of the magnetically coupled primary coil 198, depending on the position of the core element 204.

When the core element 204 is in its fully retracted position to the right, as shown in FIG. 2, with respect to the primary coil 198 and secondary coils 200, 202, the core element 204 provides a greater or more magnetic couple between the primary coil 198 and the secondary coil 200 than between primary coil 198 and secondary coil 202. As a consequence, the alternating voltage induced in secondary coil 200 has a greater magnitude than that induced in secondary coil 202. The difference between the two induced voltages is fed to a demodulater means 206 which is preset to respond to a particular envelope component of this differential voltage signal to produce a voltage signal having a constant magnitude.

When the core element 204 is in its fully extended position to the left, as shown in FIG. 4, with respect to the primary coil 198 and secondary coils 200, 202, the core element 204 provides a greater or more magnetic couple between the primary coil 198 and the other secondary coil 202 than between primary coil 198 and secondary coil 200. As a consequence, the alternating voltage induced in the secondary coil 202 has a greater magnitude than that in the secondary coil 200. The difference between the two induced alternating voltages is fed to the demodulator means 206 which is preset to respond to another particular envelope component of this differential voltage signal to produce a voltage signal equal in magnitude, but opposite in sign, to the other differential voltage signal.

During the time when the piston rod means is moving through its forward stroke (FIG. 3) and its reverse stroke (FIG. 5), and thus when the core element 204 is moving from its fully retracted position to its fully extended position, and vice versa, differential voltage signals are produced by the secondary coils 200, 202 which first decrease in magnitude from the above described constant maximum magnitude to a zero magnitude (at which magnitude the core element 204 is centered between and equally magnetically couples the secondary coils 200, 202 to the primary coil 198) and then increase in magnitude to the same maximum constant magnitude. The demodulator means 206 responds to these latter differential voltage signals in a preset way to produce voltages signals 208, 210 having respective negative and positive slopes which respectively connect up with the positive and negative constant magnitude signal components 224, 230, where the negative slope component 208 corresponds to the forward stroke of the piston rod means 16 and thus also the forward movement of the core element 204, and the positive slope component 210 corresponds to the reverse stroke of the piston rod means 16 and thus also the reverse movement of the core element 204.

It can therefore be seen that the secondary voltage signal $V_t$ (see FIG. 6) produced by the demodulator means 206 of the position transducer means 24 electrically tracks the dwell positions and stroke movements of the piston rod means 16. The secondary voltage signal $V_t$ has a reversing trapezoidal wave form with negative and positive slope components 208, 210 which is slightly time delayed in relation to the primary voltage signal $V_{cdsr}$ and opposite in sign with respect to the approximately corresponding components of the primary signal $V_{cdsr}$. Thus, the position transducer means 24 is designed to provide a linear change in the output voltage for a linear change in the displacement of the core element 204, for example, a change of one volt per each inch of core displacement. The transducer means 24, therefore, may be termed a linear variable differential transformer. A suitable transducer means is made by G. L. Collins, Inc. of Long Beach, California, Model No. SS-680.

Figure 6:
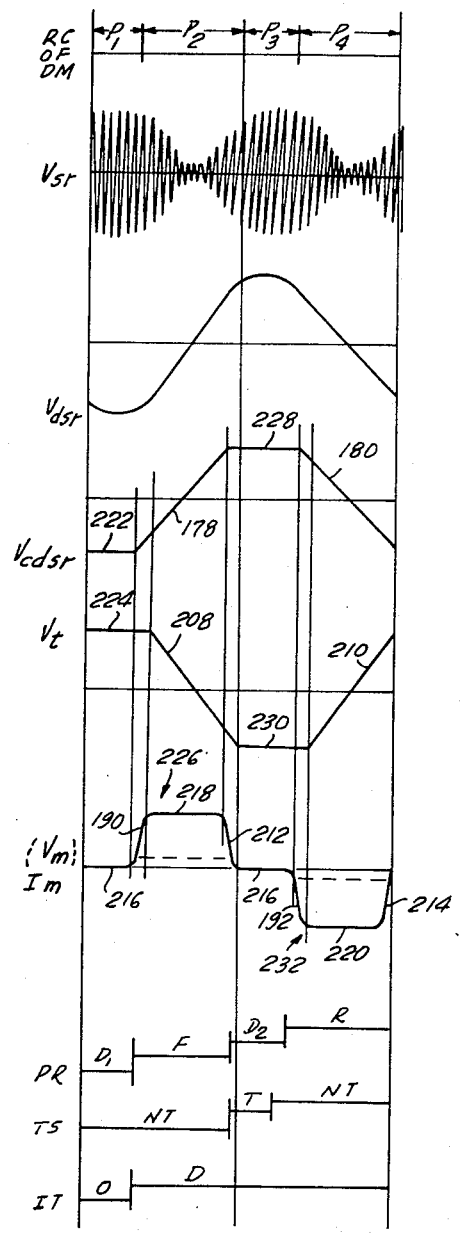
FIG. 6 is a graphical representation of the wave forms of various electrical signals developed during each cycle of the rotating drive means of the machine of FIG. 1 by electrical components of the machine and their relationship to the operations and movements of other components of the machine.

The summation means 184 receives the secondary voltage signal $V_t$ from the demodulator means 206 via lead 211 and compares it with, or impresses it upon, the primary voltage signal $V_{cdsr}$ to produce a resultant error or modified voltage signal $V_m$ (see FIG. 6). The negative and positive slope components 208, 210 of the secondary voltage signal $V_t$ produce trailing decreasing positive and negative magnitude components of the modified voltage signal $V_m$. When the modified voltage signal $V_m$ is transferred to the amplifier means 186 from the summation means 184, the original negative and positive slope components 208, 210 are converted by the amplifier means 186 into decreasing positive and negative amplified magnitude components 212, 214 of the modified current signal $I_m$. The remaining corresponding components of the primary and secondary voltage signals $V_{cdsr}$, $V_t$ when compared by the summation means 184 produce components of the modified voltage signal $V_m$ having respective zero, positive and negative constant magnitudes. Accordingly, when these respective components of the modified voltage signal $V_m$ are fed to the amplifier means 186, they are converted into respective zero, positive and negative amplified constant magnitude components 216, 218, 220.

OPERATION

FIG. 6 shows graphically the various above-mentioned voltage signals developed during each rotation cycle (RC) of the drive means (DM) 22 and their relationship to the operation of the turret means 12 and the trimming station 14 and the stroke movements and dwells of the reciprocable piston rod means 16.

The overall operation of the machine 10 may be analyzed in terms of what occurs during four separate predetermined portions ($P_1$, $P_2$, $P_3$, $P_4$) of each rotation cycle (RC) of the rotating drive means (DM) 22 of the machine 10.

Figure 8:
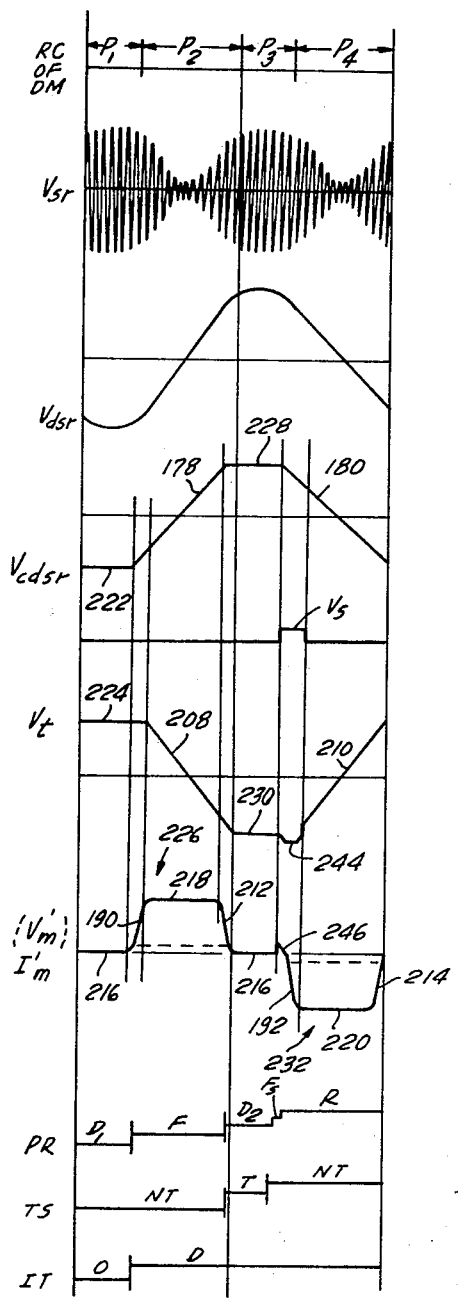
FIG. 8 is a graphical representation similar to that of FIG. 6 showing the wave forms of the various electrical signals developed during each cycle of the machine of FIG. 1 wherein the effect of a supplemental electrical signal which causes the supplemental forward stroke of the reciprocable means is shown on the various electrical signals and on the operations and movements of other components of the machine.

FIG. 2 illustrates schematically the positions of respective components of the machine 10 at the end of a first predetermined portion ($P_1$) of a rotation cycle (RC) of the rotating drive means (DM) 22. This first cycle portion ($P_1$) may preferably constitute approximately ninety degrees of a rotation cycle (RC) of the drive means (DM) 22. During this first cycle portion ($P_1$), constant equal negative and positive magnitude components 222, 224 (see FIGS. 6 and 8) respectively of the primary and secondary voltage signals $V_{cdsr}$, $V_t$ nullify each other when compared by the summation means 184. Accordingly, the magnitude of the corresponding component 216 of the modified voltage signal $V_m$ is zero, and the amplifier means 186 does not actuate the electrohydraulic servo valve means 18 during this first portion ($P_1$) of the rotation cycle (RC) of the rotating drive means 22. Therefore, the reciprocable piston rod means (PR) 16 dwells ($D_1$) in its initial fully retracted position as shown in FIG. 2. However, during this first cycle portion ($P_1$), the cam and gear unit 46 of the drive means 22 operates (O) to rotate the indexing turret (IT) 12 through one step, in the manner which has been hereinbefore described, to position an untrimmed can body C, which has theretofore been placed in the appropriate turret pocket, in concentric alignment with the trimming station 14 and with the reciprocable piston rod means 16. During the remaining cycle portions ($P_2$, $P_3$, $P_4$) the indexing turret (IT) 12 dwells (D).

The operation of the machine 10 which occurs during a second cycle portion ($P_2$) of each rotation cycle (RC) of the rotating drive means 22 is illustrated schematically by FIG. 3 which shows the reciprocable piston rod means 16 about midway during its forward stroke (F).

As in the case of the first cycle portion ($P_1$), the second cycle portion ($P_2$) may preferably constitute approximately ninety degrees of each rotation cycle (RC) of the drive means 22. During this cycle portion ($P_2$), a positive magnitude portion, generally designated 226, of the modified current signal $I_m$, which derives from the comparison by the summation means 184 (and conversion of voltage to amplified current by the amplifier means 186) of the leading positive slope component 178 of the primary voltage signal $V_{cdsr}$ with the lagging or trailing negative slope component 208 of the secondary voltage signal $V_t$, is applied to the coils 158, 160 of the servo valve motor 154 from the amplifier means 186, which torque motor 154 then applies an electrical torque on the armature member 156 which pivots the armature 156 and its associated flapper member 164 in a clockwise direction.

As a result of the pressure differential created by the reduction in size of variable orifice 150 and a corresponding increase in size of variable orifice 152 by the clockwise movement of the flapper member 164, the valve spool 114 displaces to its right of center torque equilibrium position, as seen in FIG. 3, and uncovers metering ports 126, 134. Port 126 meters pressurized fluid from the supply chamber 110 to the rear surface 96 of the piston element 80 via chamber 112 and pipe 92, while the port 134 meters fluid conducted to it by the front surface 94 of the piston element 80 to the return pipe 108 via pipe 90 and chamber 112. These concurrent meterings of pressurized fluid cause movement of the piston rod means (PR) 16 through its forward stroke (F) to transfer an untrimmed can body C to the trimming station 14 and insert it onto the mandrel 64.

As illustrated graphically in FIG. 6, it can be seen that, in the positive magnitude portion 226 of the modified current signal $I_m$, it is the increasing positive amplified magnitude component 190 which initiates the operation of the servo valve means 18 to initiate the forward stroke (F) of the reciprocable piston rod means (PR) 16. Therefore it is this component 190 which determines the initial acceleration of this piston rod means (PR) 16 which begins its forward stroke (F). Thereafter, the positive amplified constant magnitude component 218 maintains the servo valve means 18 in its FIG. 3 position to control the forward stroke (F) of the reciprocable piston rod means (PR) 16 by directing a substantially constant velocity of forward stroke movement, and the decreasing positive amplified magnitude component 212 returns the servo valve spool 114 to its null position to terminate the forward stroke (F) of the piston rod means (PR) 16. Thus, it is the component 212 which determines the deceleration of the piston rod means 16 to stop or terminate the forward stroke (F), and thus complete the cycle portion ($P_2$).

FIG. 4 illustrates schematically the positions of respective components of the machine 10 during the ensuing or third predetermined portion ($P_3$) of the rotation cycle (RC) of the rotating drive means (DM) 22. This third cycle portion ($P_3$) may preferably constitute approximately ninety degrees of a rotation cycle (RC) of the drive means (DM) 22. During this third cycle portion ($P_3$), constant equal positive and negative magnitude components 228, 230 respectively of the primary and secondary voltage signals $V_{cdsr}$, $V_t$ nullify each other when compared by the summation means 184. Accordingly the magnitude of the resultant component 216 of the modified voltage signal $V_m$ is zero, and the amplifier means 186 does not actuate the electro-hydraulic servo valve means 18 during this third portion ($P_3$) of the rotation cycle (RC) of the rotating drive means (DM) 22. Therefore, the reciprocable piston rod means (PR) 16 again dwells ($D_2$), but this time in its fully extended position as shown in FIG. 4.

However, during this third cycle portion ($P_3$), the continued rotation of the main shaft 48 of the drive means (DM) 22 actuates the trimming station (TS) 14 by rotating the tool carrier wheel 66 through that portion of the rotation cycle of the wheel 66 wherein the knife sector 68 on the wheel 66 mates with the cutter member 70 on the rotating can receiving mandrel 64 to effectuate the trimming (T) of the rotating can body C. During the other cycle portions ($P_1$, $P_2$, $P_4$), no mating occurs between the knife sector 68 and cutter member 70, thus the trimming station does not operate (NT) during these cycle portions.

The operation of the machine 10 which occurs during the fourth (and final) portion ($P_4$) of each rotation cycle (RC) of the rotating drive means (DM) 22 is illustrated schematically by FIG. 5 which shown the reciprocable piston rod means (PR) 16 about midway during its reverse stroke (R). As in the case of the other three cycle portions, the fourth cycle portion ($P_4$) may preferably constitute approximately ninety degrees of each rotation cycle (RC) of the drive means (DM) 22. A negative magnitude portion, generally designated 232, of the modified current signal $I_m$, which derives from the comparison by the summation means 184 (and conversion of voltage to amplified current by the amplifier means 186) of the leading negative slope component 180 of the primary voltage signal $V_{cdsr}$ with the lagging or trailing positive slope component 210 of the secondary voltage signal $V_t$, is applied to the coils 158, 160 of the servo valve torque motor 154 from the amplifier means 186, which torque motor 154 then applies an electrical torque on the armature member 156 which pivots the armature 156 and its associated flapper member 164 in a counterclockwise direction.

As a result of the pressure differential created by the reduction in size of variable orifice 152 and a corresponding increase in size of variable orifice 150 by the counterclockwise movement of the flapper member 164, the valve spool 114 displaces from its null position to its left of center torque equilibrium position of FIG. 5 and uncovers metering ports 124, 136.

Port 124 meters pressurized fluid from the supply chamber 110 to the front surface 94 of the piston element 80 via chamber 112 and pipe 90, while the port 136 meters fluid conducted to it by the rear surface 96 of the piston element 80 to the return pipe 108 via pipe 92 and chamber 112. These concurrent meterings of pressurized fluid cause movement of the piston rod means (PR) 16 through its reverse stroke (R) to control the transfer of the trimmed can body C' back to the same pocket of the indexing turret 12 from which it was fed.

In the illustrated embodiment of the invention, the reverse movement of the can body C' is effected by an air blast which is directed at the inside of the can body from an axial bore 78 in the mandrel 64 as the piston rod means 16 retracts, as explained hereinbefore and in the aforementioned U.S. Pat. No. 3,425,251. However, this movement can be effected by other suitable means, such as a magnet, suction cup, or gripper device mounted on the forward end of the loading element 84 and engagable against the can body.

As illustrated graphically in FIG. 6, it can be seen that, in the negative magnitude portion 232 of the modified current signal $I_m$, it is the increasing negative amplified magnitude component 192 which initiates the operation of the servo valve means 18 to initiate the reverse stroke (R) of the reciprocable piston rod means (PR) 16. Therefore it is this component 192 which begins its reverse stroke (R). Thereafter, the negative amplified constant magnitude component 220 maintains the servo valve means 18 in its FIG. 5 position to control the reverse stroke (R) of the reciprocable piston rod means (PR) 16 by directing a substantially constant velocity of reverse stroke movement, and the decreasing negative amplified magnitude component 214 returns the servo valve spool 114 to its null position to terminate the reverse stroke (R) of the piston rod means (PR) 16. Thus, it is the component 214 which determines the deceleration of the piston rod means (PR) 16 to stop or terminate the reverse stroke (R), and thus complete the cycle portion ($P_4$).

After completion of this fourth cycle portion ($P_4$), the continued rotation of the drive means 22 results in the initiation of the first cycle portion ($P_1$) of the next operating cycle of the machine 10, to thereby index the turret 12 through one step to thereby remove the trimmed can body C' from alignment with the trimming station 14 and infeed an untrimmed can body C into the position aligned with the reciprocable piston rod means 16 and trimming station 14.

SCRAP REMOVAL MEANS

Figure 7:
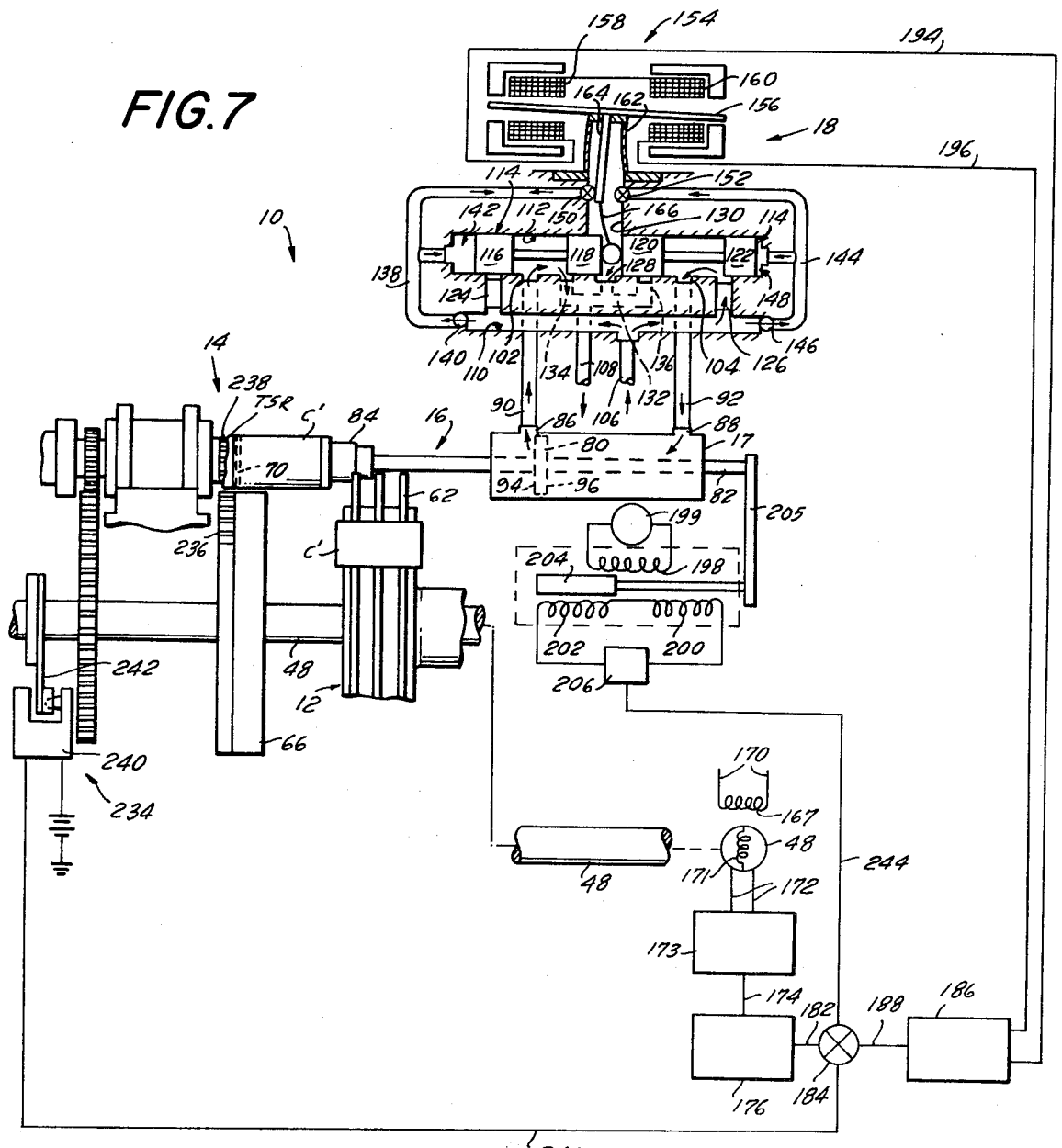
FIG. 7 is a schematical representation of the machine of FIG. 1 showing the trimmed can body after the trimming operation performed at the station as shown in FIG. 4 and further after the completion of a supplemental forward stroke of the reciprocable means moving the trimmed scrap ring into full alignment with a scrap removal component of the trimming station to insure removal of the scrap ring before commencement of the next trimming operation.

When the novel mechanical-electro-hydraulic system comprising the present invention is applied to the can body trimming machine 10, which has hereinbefore been set forth as the preferred and exemplary embodiment of the present invention, it is preferred that an additional mechanical component with its associated electrical circuitry be used in connection with the machine 10, that component being a scrap removal means, generally designated 234 (see FIGS. 1 and 7).

The description of this scrap removal means 234 is now being presented after the foregoing detailed description of the can body trimming machine 10 since the scrap removal means 234 is an additional feature of the just-described basic mechanical-electro-hydraulic system which broadly comprises the present invention in the general application of this system to machines other than the can body trimming machine 10 described hereinbefore.

The use of the scrap removal means 234 and its associated electrical circuitry in connection with the machine 10 is preferred in order to facilitate and insure the efficient removal of the trimmed scrap ring TSR after the trimming operation performed at the station 14 during each rotation (RC) of the drive means (DM) 22.

The scrap removal means 234 includes a scrap knurling sector 236 fixedly mounted on the tool carrier wheel component 66 which revolves through a circular path of travel as the wheel 66 is rotated by the shaft 48 of the drive means 22. Further, a circumferential scrap knurl roller member 238 is incorporated on the rotating can receiving mandrel 64 adjacent the cutter member 70. During the movement of the scrap knurling sector 236 through a portion of its circular path, it is in a position tangential to the scrap knurl roller member 238, wherein within said path portion the scrap knurling sector 236 and the scrap knurl roller member 238 assume a mating or meshing relation which effectuate the breaking and subsequent removal of the scrap ring TSR. The scrap knurling sector 236 is spaced circumferentially from the knife sector 68 on the wheel 66, so that the can trimming step takes place first by cutting or trimming the scrap TSR from the can in the form of an endless ring, and after the scrap ring TSR has been pushed onto the scrap knurl roller member 238, in a manner to be described below, the scrap knurling sector 236 engages the scrap ring TSR on the scrap knurl roller member 238. Therefore, the trimming operation and the scrap removal operation cannot occur simultaneously. The design of, and cooperation between, the scrap knurling sector 236 and scrap knurl roller member 238 are disclosed in greater detail in the aforementioned U.S. Pat. No. 3,425,251.

As mentioned above, after the scrap ring TSR has been trimmed from the can body C, it is pushed onto the scrap knurl roller member 238 to position it for subsequent removal. FIG. 7 shows the trimmed can body C after the trimming operation performed at station 14 and further after the completion of a supplemental forward stroke ($F_s$) of the piston rod means 16 which accomplishes the positioning of the scrap ring TSR onto the scrap knurl roller member 238 and occurs immediately prior to the commencement of the reverse stroke (R) of the piston rod means 16 which is shown in FIG. 5.

A vane switch 240, connected to a suitable electrical source, is fixedly mounted on frame support 52 and positioned adjacent the main shaft 48 of the drive means 22. A finger member 242 is fixedly mounted on the main shaft 48 of the drive means 22 and positioned thereon in relation to the adjacently positioned vane switch 240 such that during a predetermined portion of each rotation cycle of the shaft 48, the finger member 242 actuates the vane switch 240 to generate a supplemental voltage signal $V_s$ having a square wave form of a positive magnitude (FIG. 8) which is fed by lead 243 to the summation means 184.

The actuation of the supplemental voltage signal $V_s$ by the vane switch 240 may be timed with respect to the operation of the trimming station 14 and the stroke movements and dwells of the reciprocable piston rod means 16, which are integrally tied-in with each rotation cycle of the drive means 22 as has been hereinbefore described, by circumferentially displacing the finger member 242 about the shaft 48 at a predetermined position with respect to the initial angular position of the shaft 48 at the start of the rotation cycle of the shaft 48.

The summation means 184 compares or combines the supplemental voltage signal $V_s$ with the corresponding components of the primary and secondary voltage signals $V_{cdsr}$, $V_t'$ and produces a modified voltage signal $V_m'$ which is identical in all respects to the original modified voltage signal $V_m$ except for the effect of the supplemental voltage signal $V_s$, during the third cycle portion ($P_3$), on the constant equal positive and negative magnitude components 228, 230 respectively of the primary and secondary voltage signals $V_{cdsr}$, $V_t$. In this regard, negative magnitude component 230 of the secondary voltage signal $V_t'$ now reflects the supplemental forward stroke movement ($F_s$) of the piston rod means 16 by incorporating an additional small negative magnitude component 244 thereon which is caused by corresponding supplemental forward stroke of the core element 204 of the position transducer means 24.

The net effect of the supplemental voltage signal $V_s$ is the production by the summation means 184 of a voltage signal component having a very small positive magnitude to which the amplifier means 186 responds and produces a positive amplified magnitude current component 246 having a reversed sawtooth wave form which immediately precedes and connects with the increasing negative amplified magnitude component 192 of the modified current signal $I_m'$, the component 192 being the one which initiates the operation of the electro-hydraulic servo valve means 18 to actuate the reverse stroke (R) of the reciprocable piston rod means (PR) 16.

Therefore, as shown in FIG. 7, just immediately prior to the commencement of the reverse stroke (R) of the piston rod means (PR) 16, the positive amplified magnitude component 246 of the modified current signal $I_m'$, just before the end of the third cycle portion ($P_3$), is applied to the coils 158, 160 of the servo valve motor 154 from the amplifier means 186, which torque motor 154 then applies an electrical torque on the armature member 156 which pivots the armature member 156 and its associated flapper member 164 in a clockwise direction. As a result of the pressure differential created by the reduction in size of variable orifice 150 and a corresponding increase in size of variable orifice 152 by the clockwise movement of the flapper member 164, the valve spool 114 displaces to its right of center torque equilibrium position and uncovers metering ports 126, 134. In essence, the position of the spool 114 is now substantially the same as in FIG. 3. In this position, port 126 meters pressurized fluid from the supply chamber 110 to the rear surface 96 of the piston element 80 via chamber 112 and pipe 92, while the port 134 meters fluid conducted to it by the front surface 94 of the piston element 80 to the return pipe 108 via pipe 90 and chamber 112. These concurrent meterings of pressurized fluid cause movement of the piston rod means (PR) 16 through its supplemental forward stroke ($F_s$) to push the trimmed scrap ring TSR onto the scrap knurl roller member 238 of the rotating can receiving mandrel 64. As illustrated graphically in FIG. 8, it can be seen that the magnitude and duration of the component 246 of the modified current signal $I_m'$ is so small compared to that of other components of said signal that the actual forward displacement of the piston rod means 16 is very slight. Further, immediately upon the termination of its supplemental forward stroke ($F_s$), which occurs as soon as the current component 246 is generated, the piston rod means 16 begins its reverse stroke (R) as has been hereinbefore described.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred or exemplary embodiment thereof.

I claim:

1. In a machine for performing an operation on articles, the combination comprising:
    an operating station;
    means for successively aligning said articles with said station;
    reciprocable means operable through a forward and a reverse stroke for successively transferring said articles into and out of said station;
    electro-hydraulic means for hydraulically operating said reciprocable means; and
    electro-mechanical means including rotating drive means which provides a mechanical rotary motion within said electro-mechanical means for generating an electrical signal for each rotation cycle of said drive means which electrically actuates said electro-hydraulic means to hydraulically initiate each forward and each reverse stroke of said reciprocable means.

2. In a machine for performing an operation on articles, the combination comprising:
    an operating station;
    means for successively aligning said articles with said station;
    reciprocable means operable through a forward and a reverse stroke for successively transferring said articles into and out of said station;
    electro-hydraulic means for hydraulically operating said reciprocable means; and
    electro-mechanical means including rotating drive means which provides a mechanical rotary motion within said electro-mechanical means for generating an electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke of said reciprocable means.

3. In a machine for performing an operation on articles, the combination comprising:
    an operating station;
    means for successively aligning said articles with said station;
    reciprocable means operable through a forward and a reverse stroke for successively transferring said articles into and out of said station;
    electro-hydraulic means for hydraulically operating said reciprocable means; and
    electro-mechanical means including rotating drive means which provides a mechanical rotary motion within said electro-mechanical means for generating an electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke of said reciprocable means and actuates said operating station after the forward stroke and before the reverse stroke of said reciprocable means.

4. In a machine for performing an operation on articles, the combination comprising:
    an operating station;
    means for successively aligning said articles with said station;
    reciprocable means operable through a forward and a reverse stroke for successively transferring said articles into and out of said station;
    electro-hydraulic means for hydraulically operating said reciprocable means;
    primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means; and
    secondary electro-mechanical means actuated by said reciprocable means after each stroke has been initiated for generating a secondary electrical signal which is impressed on said primary electrical signal to produce a modified electrical signal which further actuates said electro-hydraulic means to hydraulically control said reciprocable means during the balance of each stroke of said reciprocable means.

5. In a machine for performing an operation on articles, the combination comprising:
    an operating station;
    means for successively aligning said articles with said station;
    reciprocable means operable through a forward and a reverse stroke for successively transferring said articles into and out of said station;

electro-hydraulic means for hydraulically operating said reciprocable means;

primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke of said reciprocable means; and secondary electro-mechanical means actuated by said reciprocable means after each stroke has been initiated for generating a secondary electrical signal which is impressed on said primary electrical signal to produce a modified electrical signal which further actuates said electro-hydraulic means to hydraulically control said reciprocable means during the balance of each stroke of said reciprocable means.

6. In a machine for performing an operation on articles, the combination comprising:

an operating station;

means for successively aligning said articles with said station;

reciprocable means operable through a forward and a reverse stroke for successively transferring said articles into and out of said station;

electro-hydraulic means for hydraulically operating said reciprocable means;

primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke of said reciprocable means and actuates said operating station after the forward stroke and before the reverse stroke of said reciprocable means; and secondary electro-mechanical means actuated by said reciprocable means after each stroke has been initiated for generating a secondary electrical signal which is impressed on said primary electrical signal to produce a modified electrical signal which further actuates said electro-hydraulic means to hydraulically control said reciprocable means during the balance of each stroke of said reciprocable means.

7. In a machine for performing an operation on articles, the combination comprising:

an operating station;

means for successively aligning said articles with said station;

reciprocable means operable through a forward and a reverse stroke for successively transferring said articles into and out of said station and dwellable before each stroke;

electro-hydraulic means for hydraulically operating said reciprocable means;

primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means; and secondary electro-mechanical means actuated by said reciprocable means for generating a secondary electrical signal which is impressed on said primary electrical signal to produce a modified electrical signal which further actuates said electro-hydraulic means to hydraulically control said reciprocable means during the balance of each stroke and the respective dwells of said reciprocable means.

8. In a machine for performing an operation on articles, the combination comprising:

an operating station;

means for successively aligning said articles with said station;

reciprocable means operable through a forward and a reverse stroke for successively transferring said article into and out of said station and dwellable before each stroke;

electro-hydraulic means for hydraulically operating said reciprocable means;

primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke, and during a dwell, of said reciprocable means; and secondary electro-mechanical means actuated by said reciprocable means for generating a secondary electrical signal which is impressed on said primary electrical signal to produce a modified electrical signal which further actuates said electro-hydraulic means to hydraulically control said reciprocable means during the balance of each stroke and the respective dwells of said reciprocable means.

9. In a machine for performing an operation on articles, the combination comprising:

an operating station;

means for successively aligning said articles with said station;

reciprocable means operable through a forward and a reverse stroke for successively transferring said articles into and out of said station and dwellable before each stroke;

electro-hydraulic means for hydraulically operating said reciprocable means;

primary electro-mechanical means including rotating drive means which provides a mechanical rotary motion within said primary electro-mechanical means for generating a primary electrical signal for each rotation cycle of said drive means which electrically actuates said electrohydraulic means to hydraulically initiate each forward and each reverse stroke of said reciprocable means, and further during each rotation cycle of said drive means, said drive means actuates said article aligning means before the forward stroke, and during a dwell, of said reciprocable means and actuates said operating station after the forward stroke, during a dwell, and before the reverse stroke, of said reciprocable means; and secondary electro-mechanical means actuated by said reciprocable means for generating a secondary electrical signal which is impressed on said primary electrical signal to produce a modified electrical signal which further actuates said electrohydraulic means to hydraulically control said reciprocable means during the balance of each stroke and the respective dwells of said reciprocable means.

10. In machine for performing an operation on articles, the combination comprising:

an operating station;

means for successively aligning said articles with said station;

reciprocable means dwellable during a first portion of each operating cycle of said machine, operable through a forward stroke during a second portion of each operating cycle of said machine for transferring an article into said station; dwellable during a third portion of each operating cycle of said machine, and operable through a reverse stroke during a fourth portion of each operating cycle of said machine for transferring said article out of said station;

electro-hydraulic means for hydraulically operating said reciprocable means;

primary electro-mechanical means including rotating drive means which turns through one rotation cycle for each operating cycle of said machine and provides a mechanical rotary motion within said primary electro-mechanical means for generating a primary electrical signal for each rotation cycle of said drive means which electrically actuates said electro-hydraulic means to hydraulically initiate the forward stroke of said reciprocable means at the beginning of said second portion of each rotation cycle of said drive means and hydraulically initiate the reverse stroke of said reciprocable means at the beginning of said fourth portion of each rotation cycle of said drive means; and secondary electro-mechanical means actuated by said reciprocable means for generating a secondary electrical signal which is impressed on said primary electrical signal to produce a modified electrical signal which further actuates said electrohydraulic means to hydraulically control said reciprocable means during the balance of each stroke of said reciprocable means and terminate each stroke of said reciprocable means at the end of said respective second and fourth portions of each rotation cycle of said drive means and hydraulically dwell said reciprocable means during said respective first and third portions of each rotation cycle of said drive means.

11. In a machine for performing an operation on articles, the combination comprising:

an operating station;

means for successively aligning said articles with said station;

reciprocable means dwellable during a first portion of each operating cycle of said machine, operable through a forward stroke during a second portion of each operating cycle of said machine for transferring an article into said station, dwellable during a third portion of each operating cycle of said machine, and operable through a reverse stroke during a fourth portion of each operating cycle of said machine for transferring said article out of said station;

electro-hydraulic means for hydraulically operating said reciprocable means;

primary electro-mechanical means including rotating drive means which turns through one rotation cycle for each operating cycle of said machine and provides a mechanical rotary motion within said primary electro-mechanical means for generating a primary electrical signal for each rotation cycle of said drive means which electrically actuates said electro-hydraulic means to hydraulically initiate the forward stroke of said reciprocable means at the beginning of said second portion of each rotation cycle of said drive means and hydraulically initiate the reverse stroke of said reciprocable means at the beginning of said fourth portion of each rotation cycle of said drive means, and further said drive means actuates said article aligning means during said first portion of each rotation cycle of said drive means before the forward stroke, and during a dwell, of said reciprocable means; and secondary electro-mechanical means actuated by said reciprocable means for generating a secondary electrical signal which is impressed on said primary electrical signal to produce a modified electrical signal which further actuates said electrohydraulic means to hydraulically control said reciprocable means during the balance of each stroke of said reciprocable means and terminate each stroke of said reciprocable means at the end of said respective second and fourth portions of each rotation cycle of said drive means and hydraulically dwell said reciprocable means during said respective first and third portions of each rotation cycle of said drive means.

12. In a machine for performing an operation on articles, the combination comprising:

an operating station;

means for successively aligning said articles with said station;

reciprocable means dwellable during a first portion of each operating cycle of said machine, operable through a forward stroke during a second portion of each operating cycle of said machine for transferring an article into said station, dwellable during a third portion of each operating cycle of said machine, and operable through a reverse stroke during a fourth portion of each operating cycle of said machine for transferring said article out of said station;

electro-hydraulic means for hydraulically operating said reciprocable means;

primary electro-mechanical means including rotating drive means which turns through one rotation cycle for each operating cycle of said machine and provides a mechanical rotary motion within said primary electro-mechanical means for generating a primary electrical signal for each rotation cycle of said drive means which electrically actuates said electro-hydraulic means to hydraulically initiate the forward stroke of said reciprocable means at the beginning of said second portion of each rotation cycle of said drive means and hydraulically initiate the reverse stroke of said reciprocable means at the beginning of said fourth portion of each rotation cycle of said drive means, and further said drive means actuates said article aligning means during said first portion of each rotation cycle of said drive means before the forward stroke, and during a dwell, of said reciprocable means and actuates said operating station during said third portion of each rotation cycle of said drive means after the forward stroke, during another dwell, and before the reverse stroke of said reciprocable means; and secondary electro-mechanical means actuated by said reciprocable means for generating a secondary electrical signal which is impressed on said primary electrical signal to produce a modified electrical signal which further actuates said electro-hydraulic means to hydraulically control said reciprocable means during the balance of each stroke of said reciprocable means and terminate each stroke of said reciprocable means at the end of said respective second and fourth portions of each rotation cycle of said drive means and hydraulically dwell said reciprocable means during said respective first and third portions of each rotation cycle of said drive means.

13. In a machine for performing an operation on articles, the combination comprising:

an operating station;

means for successively aligning said articles with station;

reciprocable means dwellable during a first portion of each operating cycle of said machine, operable through a forward stroke during a second portion of each operating cycle of said machine for transferring an article into said station, dwellable during a third portion of each operating cycle of said machine, and operable through a reverse stroke during a fourth portion of each operating cycle of said machine for transferring said article out of said station;

rotating drive means for actuating said article aligning means during said first portion of each operating cycle of said machine and for actuating said operating station during said third portion of each operating cycle of said machine, said rotating drive means turning through one rotation cycle for each operating cycle of said machine;

electro-hydraulic means for hydraulically operating said reciprocable means;

electrically operated means for electrically actuating said electro-hydraulic means;

means actuated by said rotating drive means for generating a primary electrical signal during each rotation cycle of said drive means which operates said electrically operated means to actuate said electrohydraulic means to hydraulically initiate each forward and each reverse stroke of said reciprocable means at the beginning of said respective second and fourth portions of each rotation cycle of said drive means; and means actuated by said reciprocable means for generating a secondary electrical signal which is impressed on said primary electrical signal to produce a modified electrical signal which operates said electrically operated means to actuate said electro-hydraulic means to hydraulically control said reciprocable means during the balance of each stroke of said reciprocable means and terminate each stroke of said reciprocable means at the end of said respective second and fourth portions of each rotation cycle of said drive means and hydraulically dwell said reciprocable means during said respective first and third portions of each rotation cycle of said drive means.

14. In a machine for performing an operation on articles, the combination comprising:

an operating station;

means for successively aligning said articles with said station;

reciprocable means operable through a forward stroke during one portion of each operating cycle of said machine for transferring an article into said station and operable through a reverse stroke during another portion of each operating cycle of said machine for transferring said article out of said station;

rotating drive means for actuating said article aligning means before said forward stroke of said reciprocable means during each operating cycle of said machine and for actuating said operating station after said forward stroke and before said reverse stroke of said reciprocable means during each operating cycle of said machine, said rotating drive means turning through one rotation cycle for each operating cycle of said machine;

electro-hydraulic means for hydraulically operating said reciprocable means;

amplifier means for electrically actuating said electro-hydraulic means;

signal conditioning means for operating said amplifier means;

means actuated by said rotating drive means for generating a primary electrical signal during each rotation cycle of said drive means;

said signal conditioning means receiving said primary electrical signal and producing a conditioned primary electrical signal having positive and negative slope components which operate said amplifier means to actuate said electro-hydraulic means to respectively hydraulically initiate said forward and reverse strokes of said reciprocable means at the beginning of said respective portions of each rotation cycle of said drive means; and means actuated by said reciprocable means after each stroke has been initiated for generating a secondary electrical signal which is impressed on said conditioned primary electrical signal to produce a modified electrical signal which operates said amplifier means to actuate said electro-hydraulic means to hydraulically control said reciprocable means during the balance of each stroke of said reciprocable means and terminate each stroke of said reciprocable means at the end of said respective portions of each rotation cycle of said drive means.

15. In a machine for performing an operation on articles, the combination comprising:
an operating station;
means for successively aligning said articles with said station;
reciprocable mans dwellable during a first portion of each operating cycle of said machine, operable through a forward stroke during a second portion of each operating cycle of said machine for transferring an article into said station, dwellable during a third portion of each operating cycle of said machine, and operable through a reverse stroke during a fourth portion of each operating cycle of said machine for transferring said article out of said station;
rotating drive means for actuating said article aligning means during said first portion of each operating cycle of said machine and for actuating the operating station during said third portion of each operating cycle of said machine, said rotating drive means turning through one rotation cycle for each operating cycle of said machine;
electro-hydraulic means for hydraulically operating said reciprocating means;
amplifier means for electrically actuating said electro-hydraulic means;
signal conditioning means for operating said amplifier means;
means actuated by said rotating drive means for generating a primary electrical signal during each cycle of said rotating drive means;
said signal conditioning means receiving said primary electrical signal and producing a conditioned primary electrical signal having positive and negative slope components which operate said amplifier means to actuate said electro-hydraulic means to respectively hydraulically initiate said forward and reverse strokes of said reciprocable means at the beginning of said respective second and fourth portions of each rotation cycle of said machine; and
means actuated by said reciprocable means for generating a secondary electrical signal which is impressed on said conditioned primary electrical signal to produce a modified electrical signal which operates said amplifier means to actuate said electro-hydraulic means to hydraulically control said reciprocable means during the balance of each stroke of said reciprocable means and terminate each stroke of said reciprocable means at the end of said respective second and fourth portions of each rotation cycle of said drive means and hydraulically dwell said reciprocable means during said respective first and third portions of each rotation cycle of said drive means.

16. In a machine for performing an operation on articles, the combination comprising:
an operating station;
means for successively aligning said articles with said station;
reciprocable means operable through a forward stroke during one portion of each operating cycle of said machine for transferring an article into said station and operable through a reverse stroke during another portion of each operating cycle of said machine for transferring said article out of said station;
rotating drive means for actuating said article aligning means before said forward stroke of said reciprocable means during each operating cycle of said machine and for actuating said operating station after said forward stroke and before said reverse stroke of said reciprocable means during each operating cycle of said machine, said rotating drive means turning through one rotation cycle for each operating cycle of said machine;
electro-hydraulic means for hydraulically operating said reciprocable means;
amplifier means for electrically actuating said electro-hydraulic means;
signal conditioning means for operating said amplifier means;
synchro-resolver means actuated by said rotating drive means for generating a primary voltage signal during each rotation cycle of said drive means, said primary voltage signal having a sine wave envelope component;
said signal conditioning means responding to said sine wave envelope component of said primary voltage signal and producing a conditioned primary voltage signal having a reversing trapezoidal wave form with positive and negative slope components which operate said amplifier means to actuate said electro-hydraulic means to respectively hydraulically initiate said forward and reverse strokes of said reciprocable means at the beginning of said respective portions of each rotation cycle of said drive means;
transducer means actuated by said reciprocable means after each stroke has been initiated for generating a secondary voltage signal having a reversing trapezoidal wave form, said secondary voltage signal being phase delayed in relation to said conditioned primary voltage signal and having negative and positive slope components which correspond to said positive and negative slope components of said conditioned primary voltage signal, said secondary voltage signal being impressed on said conditioned primary voltage signal to produce a modified voltage signal, said positive and negative slope components of said conditioned primary voltage signal producing leading increasing positive and negative magnitude components of said modified voltage signal and said negative and positive slope components of said secondary voltage signal producing trailing decreasing positive and negative magnitude components of said modified voltage signal; and
said amplifier means responding to said modified voltage signal and producing a current signal having leading increasing positive and negative magnitude components and trailing decreasing positive and negative magnitude components which correspond to said components of said modified voltage signal, said current signal further actuating said electro-hydraulic means to hydraulically control said reciprocable means during the balance of each stroke of said reciprocable means wherein said trailing decreasing positive and negative magnitude components of said current signal actuate said electro-hydraulic means to hydraulically terminate respectively the end of said respective portions of each rotation cycle of said drive means.

17. In a machine for performing an operation on articles, the combination comprising:
   an operating station;
   means for successively aligning said articles with said station;
   reciprocable means dwellable during a first portion of each operating cycle of said machine, operable through a forward stroke during a second portion of each operating cycle of said machine for transferring an article into said station, dwellable during a third portion of each operating cycle of said machine, and operable through a reverse stroke during a fourth portion of each operating cycle of said machine for transferring said article out of said station;
   rotating drive means for actuating said article aligning means during said first portion of each operating cycle of said machine and for actuating said operating station during said third portion of each operating cycle of said machine, said rotating drive means turning through one rotation cycle for each operating cycle of said machine;
   electro-hydraulic means for hydraulically operating said reciprocable means;
   amplifier means for electrically actuating said electro-hydraulic means;
   synchro-resolver means actuated by said rotating drive means for generating a primary voltage signal during each rotation cycle of said drive means, said primary voltage signal having a sine wave envelope component;
   demodulator means responding to said sine wave envelope component of said primary voltage signal and producing a demodulated primary voltage signal having a sine wave form equivalent to said sine wave envelope component of said primary voltage signal;
   clipper means responding to said demodulated primary voltage signal and producing a clipped and demodulated primary voltage signal having a reversing trapezoidal wave form with positive and negative slope components;
   summation means responding to said clipped and demodulated primary voltage signal and transferring said positive and negative slope components of said clipped and demodulated primary voltage signal to said amplifier means, said positive and negative slope components operating said amplifier means to actuate said electro-hydraulic means to respectively hydraulically initiate said forward and reverse strokes of said reciprocable means at the beginning of said respective second and fourth portions of each rotation cycle of said drive means;
   transducer means actuated by said reciprocable means for generating a secondary voltage signal having a reversing trapezoidal wave form, said secondary voltage signal being phase delayed in relation to said clipped and demodulated primary voltage signal and having negative and positive slope components which correspond to said positive and negative slope components of said clipped and demodulated primary voltage signal;
   said summation means responding to said secondary voltage signal and impressing said secondary voltage signal on said clipped and demodulated primary voltage signal to produce a modified voltage signal, said positive and negative slope components of said clipped and demodulated primary voltage signal producing leading increasing positive and negative magnitude components of said modified voltage signal and said negative and positive slope components of said secondary voltage signal producing trailing decreasing positive and negative magnitude components of said modified voltage signal; and
   said amplifier means responding to said modified voltage signal and producing a current signal having leading increasing positive and negative magnitude components and trailing decreasing positive and negative magnitude components which correspond to said components of said modified voltage signal, said current signal actuating said electro-hydraulic means to further hydraulically control said reciprocable means during the balance of each stroke of said reciprocable means, wherein said trailing decreasing positive and negative magnitude components of said current signal actuate said electro-hydraulic means to hydraulically terminate respectively said forward and reverse strokes of said reciprocable mans at the end of said respective second and fourth portions of each rotation cycle of said drive means, and said current signal actuating said electro-hydraulic means to hydraulically dwell said reciprocable means during said respective first and third portions of each rotation cycle of said drive means.

18. In a machine for performing an operation on articles, the combination comprising:
   an operating station;
   rotatable turret means for successively aligning said articles with said station;
   rotating drive means for actuating said rotatable turret means during a first portion of each rotation cycle of said drive means to align an article with said station;
   longitudinally reciprocable hydraulic slide means, having an article loading component at its forward end, said slide means dwellable during said first portion of each rotation cycle of said drive means in a retracted position wherein said article loading component is positioned remote from said station and aligned with said article and said station along a common axis, said slide means operable through a forward stroke during a second portion of each rotation cycle of said drive means for delivering said article from said turret means to said station by means of said article loading component of said slide means, said slide means dwellable during a third portion of each rotation cycle of said drive means in an extended position wherein said article loading component is positioned adjacent said station, and said slide means operable through a reverse stroke during a fourth portion of each rotation cycle of said drive means for returning said article from said station to said turret means by means of said article loading component of said slide means;

said rotating drive means actuating said operating station during said third portion of each rotation cycle of said drive means;

electro-hydraulic servo valve means for hydraulically operating said longitudinally reciprocable hydraulic slide means;

amplifier means for electrically actuating said electro-hydraulic servo valve means;

synchro-resolver means actuated by said rotating drive means for generating a primary voltage signal during each rotation cycle of said drive means, said primary voltage signal having a sine wave envelope component;

demodulator means responding to said sine wave envelope component of said primary voltage signal and producing a demodulated primary voltage signal having a sine wave form equivalent to said sine wave component of said primary voltage signal;

clipper means responding to said demodulated primary voltage signal and producing a clipped and demodulated primary voltage signal having a reversing trapezoidal wave form with positive and negative slope components;

summation means responding to said clipped and demodulated primary voltage signal and a subsequently formed secondary voltage signal and producing a modified voltage signal which represents the difference between said primary and secondary signals;

said amplifier means responding to said modified voltage signal and producing a corresponding modified current signal to actuate said electro-hydraulic servo valve means to hydraulically dwell said reciprocable slide means during said first portion of each rotation cycle of said drive means, hydraulically operate said reciprocable slide means through its forward stroke during said second portion of each rotation cycle of said drive means, hydraulically dwell said reciprocable slide means during said third portion of each rotation cycle of said drive means, and hydraulically operate said reciprocable slide means through its reverse stroke during said fourth portion of each rotation cycle of said drive means;

transducer means for generating said subsequently formed secondary voltage signal having a reversing trapezoidal wave form linearly correlated to the dwells and strokes of said reciprocable slide means during said respective portions of each rotation cycle of said drive means, said secondary voltage signal being phase delayed in relation to said clipped and demodulated primary voltage signal and having negative and positive slope components which correspond to said positive and negative slope components of said clipped and demodulated primary voltage signal;

said modified voltage signal produced by said summation means having leading increasing positive and negative magnitude components produced by said positive and negative slope components of said clipped and demodulated primary voltage signal and trailing decreasing positive and negative magnitude components produced by said negative and positive slope components of said secondary voltage signal; and said modified current signal produced by said amplifier means having leading increasing positive and negative amplified magnitude components and trailing decreasing positive and negative amplified magnitude components which correspond to said components of said modified voltage signal, said modified current signal further comprised by:

a first signal portion, which precedes said leading increasing positive amplified magnitude component, having a null magnitude for a first period corresponding to said first portion of each rotation cycle of said drive means;

a second signal portion, between said leading increasing positive amplified magnitude component and said trailing decreasing positive amplified magnitude component and inclusive of said components, having a positive magnitude for a second period corresponding to said second portion of each rotation cycle of said drive means;

a third signal portion, between said trailing decreasing positive amplified magnitude component and said leading increasing negative amplified magnitude component and exclusive of said components, having a null magnitude for a third period corresponding to said third portion of each rotation cycle of said drive means; and a fourth signal portion, between said leading increasing negative amplified magnitude component and said trailing decreasing negative amplified magnitude component and inclusive of said components, having a negative magnitude for a fourth period corresponding to said fourth portion of each rotation cycle of said drive means.

19. In a machine for performing an operation on articles, the combination according to claim 18 wherein said modified current signal produced by said amplifier means, said first signal portion actuates said electro-hydraulic servo valve means to maintain a null flow of hydraulic fluid for said first period within said reciprocable slide means which dwells said reciprocable slide means during said first portion of each rotation cycle of said drive means, said second signal portion actuates said electro-hydraulic servo valve means to produce a hydraulic fluid flow for said second period in one direction within said reciprocable slide means which operates said reciprocable slide means through its forward stroke during said second portion of each rotation cycle of said drive means, wherein said leading increasing positive amplified magnitude component of said second signal portion actuates said servo valve means to initiate said fluid flow at the beginning of said second period and said trailing decreasing positive amplified magnitude component of said second signal portion actuates said servo valve means to terminate said fluid flow at the end of said second period, said third signal portion actuates said electrohydraulic servo valve means to maintain a null flow of hydraulic fluid for said third period within said reciprocable slide means which dwells said reciprocable slide means during said third portion of each rotation cycle of said drive means, and said fourth signal portion actuates said electrohydraulic servo valve means to produce a hydraulic fluid flow for said fourth period in an opposite direction within said reciprocable slide means which operates said reciprocable slide means through its reverse stroke during said fourth portion of each rotation cycle of said drive means, wherein said leading increasing negative amplified magnitude component of said fourth signal portion actuates said servo valve means to initiate said fluid flow at the beginning of said fourth period and said trailing decreasing negative amplified magnitude component of said fourth signal portion actuates said servo valve means to terminate said fluid flow at the end of said fourth period.

20. In a machine for performing a trimming operation on untrimmed can bodies, the combination comprising:

a trimming station;

a rotatable multi-pocketed indexing turret for successively aligning said untrimmed can bodies with said trimming station;

rotating drive means for actuating said rotatable indexing turret during a first portion of each rotation cycle of said drive means to align an untrimmed can body with said trimming station;

a hydraulic cylinder means;

a reciprocable piston rod means, mounted within said hydraulic cylinder means, dwellable during a first portion of each rotation cycle of said rotating drive means, operable through a forward stroke during a second portion of each rotation cycle of said rotating drive means for transferring an untrimmed can body into said trimming station, dwellable during a third portion of each rotation cycle of said rotating drive means, and operable through a reverse stroke during a fourth portion of each rotation cycle of said drive means for transferring a trimmed can body out of said trimming station;

said rotating drive means actuating said trimming station during said third portion of each rotation cycle of said drive means;

electro-hydraulic servo valve means for metering the flow of hydraulic fluid to said hydraulic cylinder means for hydraulically operating said reciprocable piston rod means;

electrically operated means for electrically actuating said electro!-hydraulic servo valve means;

means actuated by said rotating drive means for generating a primary electrical signal during each rotation cycle of said drive means which operates said electrically operated means to actuate said electrohydraulic servo valve means to meter hydraulic fluid to said hydraulic cylinder means so as to initiate each forward and each reverse stroke of said reciprocable piston rod means at the beginning of said respective second and fourth portions of each rotation cycle of said drive means;

means actuated by said reciprocable piston rod means for generating a secondary electrical signal which is impressed on said primary electrical signal to produce a modified electrical signal which operates said electrically operated means to actuate said electrohydraulic servo valve means to meter hydraulic fluid to said hydraulic cylinder means so as to control said reciprocable piston rod means during the balance of each stroke of said reciprocable means and terminate each stroke of said reciprocable piston rod means at the end of said respective second and fourth portions of each rotation cycle of said drive means, said reciprocable piston rod means dwelling during said respective first and third portions of each rotation cycle of said drive means during non-actuation of said electro-hydraulic servo valve means by said electrically operated means;

a scrap removal station operated by said rotating drive means immediately prior to the end of said third portion of each rotation cycle of said drive means; and means actuated by said rotating drive means for generating a supplemental electrical signal which further modifies said modified electrical signal to operate said electrically operated means to actuate said electrohydraulic servo valve means to meter hydraulic fluid to said cylinder means which moves said reciprocable piston rod means through a supplemental forward stroke that positions the scrap trimmed from said can body within said scrap removal station immediately after the termination of said trimming operation and before the actuation of said scrap removal by said rotating drive means.

21. In a machine for performing an operation on an article, the combination comprising:

an operating station;

means for aligning said article with said station;

reciprocable means operable through a forward and a reverse stroke for transferring said article into and out of said station;

electro-hydraulic means for hydraulically operating said reciprocable means; and electro-mechanical means including rotating drive means which provides a mechanical rotary motion within said electro-mechanical means for generating an electrical signal for each rotation cycle of said drive means which electrically actuates said electro-hydraulic means to hydraulically initiate each forward and each reverse stroke of said reciprocable means.

22. In a machine for performing an operation on an article, the combination comprising:

an operating station;

means for aligning said article with said station;

reciprocable means operable through a forward and a reverse stroke for transferring said article into and out of said station;

electro-hydraulic means for hydraulically operating said reciprocable means; and electro-mechanical means including rotating drive means which provides a mechanical rotary motion within said electro-mechanical means for generating an electrical signal for each rotation cycle of said drive means which electrically actuates said electro-hydraulic means to hydraulically initiate each forward and each reverse stroke of said reciprocable mans, and further, during each rotation cycle of said drive means, said drive means actuates said article aligning means before the forward stroke of said reciprocable means.

23. In a machine for performing an operation on an article, the combination comprising:
   an operating station;
   means for aligning said article with said station;
   reciprocable means operable through a forward and a reverse stroke for transferring said article into and out of said station;
   electro-hydraulic means for hydraulically operating said reciprocable means; and
   electrical-mechanical means including rotating drive means which provides a mechanical rotary motion within said electro-mechanical means for generating an electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke of said reciprocable means and actuates said operating station after the forward stroke and before the reverse stroke of said reciprocable means.

24. In a machine for performing an operation on an article, the combination comprising:
   an operating station;
   means for aligning said article with said station;
   reciprocable means operable through a forward and a reverse stroke for transferring said article into and out of said station;
   electro-hydraulic means for hydraulically operating said reciprocable means;
   primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means; and
   secondary electro-mechanical means actuated by said reciprocable means after each stroke has been initiated for generating a secondary electrical signal which is impressed on said primary electrical signal to produce a modified electrical signal which further actuates said electro-hydraulic means to hydraulically control said reciprocable means during the balance of each stroke of said reciprocable means.

25. In a machine for performing an operation on an article, the combination comprising:
   an operating station;
   means for aligning said article with said station;
   reciprocable means operable through a forward and a reverse stroke for transferring said article into and out of said station;
   electro-hydraulic means for hydraulically operating said reciprocable means;
   primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke of said reciprocable means; and
   secondary electro-mechanical means actuated by said reciprocable means after each stroke has been initiated for generating a secondary electrical signal which is impressed on said primary electrical signal to produce a modified electrical signal which further actuates said electro-hydraulic means to hydraulically control said reciprocable means during the balance of each stroke of said reciprocable means.

26. In a machine for performing an operation on an article, the combination comprising:
   an operating station;
   means for aligning said article with said station;
   reciprocable means operable through a forward and a reverse stroke for transferring said article into and out of said station;
   electro-hydraulic means for hydraulically operating said reciprocable means;
   primary electro-mechanical means including rotating drive means which provides a mechanical rotary motion within said primary electro-mechanical means for generating a primary electrical signal for each rotation cycle of said drive means which electrically actuates said electrohydraulic means to hydraulically initiate each forward and each reverse stroke of said reciprocable means, and further, during each rotation cycle of said drive means, said drive means actuates said article aligning means before the forward stroke of said reciprocable means and actuates said operating station after the forward stroke and before the reverse stroke of said reciprocable means; and
   secondary electro-mechanical means actuated by said reciprocable means after each stroke has been initiated for generating a secondary electrical signal which is impressed on said primary electrical signal to produce a modified electrical signal which further actuates said electro-hydraulic means to hydraulically control said reciprocable means during the balance of each stroke of said reciprocable means.

27. In a machine for performing an operation on an article, the combination comprising:
   an operating station;
   means for aligning said article with said station;
   reciprocable means operable through a forward and a reverse stroke for transferring said article into and out of said station and dwellable before each stroke;
   electro-hydraulic means for hydraulically operating said reciprocable means;

primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means; an secondary electro-mechanical means actuated by said reciprocable means for generating a secondary electrical signal which is impressed on said primary electrical signal to produce a modified electrical signal which further actuates said electro-hydraulic means to hydraulically control said reciprocable means during the balance of each stroke and the respective dwells of said reciprocable means.

28. In a machine for performing an operation on an article, the combination comprising:

an operating station;

means for aligning said article with said station;

reciprocable means operable through a forward and a reverse stroke for transferring said article into and out of said station and dwellable before each stroke;

electro-hydraulic means for hydraulically operating said reciprocable means;

primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke, and during a dwell, of said reciprocable means; and secondary electro-mechanical means actuated by said reciprocable means for generating a secondary electrical signal which is impressed on said primary electrical signal to produce a modified electrical signal which further actuates said electro-hydraulic means to hydraulically control said reciprocable means during the the balance of each stroke and the respective dwells of said reciprocable means.

29. In a machine for performing an operation on an article, the combination comprising:

an operating station;

means for aligning said article with said station;

reciprocable means operable through a forward and a reverse stroke for transferring said article into and out of said station and dwellable before each stroke;

electro-hydraulic means for hydraulically operating said reciprocable means;

primary electro-mechanical means including rotating drive means which provides a mechanical rotary motion within said primary electro-mechanical means for generating a primary electrical signal for each rotation cycle of said drive means which electrically actuates said electro-hydraulic means to hydraulically initiate each forward and each reverse stroke of said reciprocable means, and further, during each rotation cycle of said drive means, said drive means actuates said article aligning means before the forward stroke, and during a dwell, of said reciprocable means and actuates said operating station after the forward stroke, during a dwell, and before the reverse stroke, of said reciprocable means;

and secondary electro-mechanical means actuated by said reciprocable means for generating a secondary electrical signal which is impressed on said primary electrical signal to produce a modified electrical signal which further actuates said electro-hydraulic means to hydraulically control said reciprocable means during the balance of each stroke and the respective dwells of said reciprocable means.

\* \* \* \* \*